United States Patent
Goldberg et al.

(10) Patent No.: US 6,816,455 B2
(45) Date of Patent: Nov. 9, 2004

(54) DYNAMIC PACKET FILTER UTILIZING SESSION TRACKING

(75) Inventors: Ronen Goldberg, Givat Shmuel (IL); Gady Daniely, Tzur Eigal (IL); Moshe Zezak, Rishon Letzion (IL); Drory Shohat, Ramat Gan (IL)

(73) Assignee: Telecom Italia S.p.A., Milan (IT)

( * ) Notice: Subject to any disclaimer, the term of this patent is extended or adjusted under 35 U.S.C. 154(b) by 496 days.

(21) Appl. No.: 09/851,768

(22) Filed: May 9, 2001

(65) Prior Publication Data

US 2004/0013112 A1 Jan. 22, 2004

(51) Int. Cl.⁷ .............................................. H04L 12/66
(52) U.S. Cl. ..................... 370/230; 370/230; 370/389; 370/401
(58) Field of Search ................................ 709/224–225, 709/238, 227; 713/201, 152; 370/389, 230, 401; 711/118

(56) References Cited

U.S. PATENT DOCUMENTS

| | | | |
|---|---|---|---|
| 5,446,736 A | | 8/1995 | Gleeson et al. ............ 370/85.13 |
| 5,623,601 A | * | 4/1997 | Vu .............................. 713/201 |
| 5,627,829 A | | 5/1997 | Gleeson et al. ............. 370/230 |
| 5,828,846 A | * | 10/1998 | Kirby et al. ................. 709/238 |
| 5,867,494 A | | 2/1999 | Krishnaswamy et al. ... 370/352 |
| 5,960,177 A | | 9/1999 | Tanno .................... 395/200.59 |
| 5,983,270 A | * | 11/1999 | Abraham et al. ........... 709/224 |
| 5,999,525 A | | 12/1999 | Krishnaswamy et al. ... 370/352 |
| 6,006,268 A | * | 12/1999 | Coile et al. ................. 709/227 |
| 6,092,191 A | | 7/2000 | Shimbo et al. ............. 713/153 |
| 6,122,665 A | | 9/2000 | Bar et al. .................... 709/224 |
| 6,173,364 B1 | * | 1/2001 | Zenchelsky et al. ........ 711/118 |
| 6,182,149 B1 | | 1/2001 | Nessett et al. .............. 709/247 |
| 6,185,680 B1 | | 2/2001 | Shimbo et al. ............. 713/160 |
| 6,219,706 B1 | * | 4/2001 | Fan et al. .................... 709/225 |
| 6,219,786 B1 | * | 4/2001 | Cunningham et al. ...... 713/152 |
| 6,233,686 B1 | * | 5/2001 | Zenchelsky et al. ........ 713/201 |
| 6,341,130 B1 | * | 1/2002 | Lakshman et al. .......... 370/389 |
| 6,347,312 B1 | * | 2/2002 | Byrne et al. .................... 707/3 |
| 6,496,935 B1 | * | 12/2002 | Fink et al. .................. 713/201 |

FOREIGN PATENT DOCUMENTS

EP 0910197 A2 4/1999

OTHER PUBLICATIONS

Montenegro, G. et al., "Sun's SKIP Firewall Traversal for Mobile IP", Network Working Group–RFC 2356, Jun. 1998.

* cited by examiner

Primary Examiner—Alpus H. Hsu
Assistant Examiner—Daniel Ryman
(74) Attorney, Agent, or Firm—Howard Zaretsky; Zaretsky & Associates PC

(57) ABSTRACT

A novel and useful dynamic packet filter that can be incorporated in a hardware based firewall suitable for use in portable computing devices such as cellular telephones and wireless connected PDAs adapted to connect to the Internet. The invention performs dynamic packet filtering on packets received over an input packet stream. The dynamic filter checks dynamic protocol behavior using information extracted from the received packet. Sessions are created and stored in a session database to track the state of communications between the source and destination. Recognition of a session is accelerated by use of a hash table to quickly determine the corresponding session record in the session database. Session related data is read from the session database and the received packet is checked against a set of rules to determine whether to allow or deny the packet.

40 Claims, 20 Drawing Sheets

DYNAMIC PACKET FILTER UTILIZING SESSION TRACKING

FIELD OF THE INVENTION

The present invention relates generally to data communication systems and more particularly relates to a dynamic packet filter utilizing session tracking to make decisions on whether to allow or deny a packet.

BACKGROUND OF THE INVENTION

In recent years, the world has witnessed the explosive growth of the Internet. Each year many more hosts are added while the number of users seems to be growing without limit. The Internet enables communications using different techniques including remote computer login, file transfer, world wide web (WWW) browsing, email, etc. Various protocols have been designed and are in use on the Internet to handle various types of communications. For example, file transfer protocol (FTP) for file transfer, hypertext markup language (HTML) for web traffic, etc. Generally, the protocol related to Internet communications are grouped under the umbrella of the transmission control protocol/internet protocol (TCP/IP) suite of protocols that includes protocols at various layers of the OSI communications stack.

A key feature of the Internet is that it is a public network that is accessible by nearly anyone with a computer, telephone line and Internet service provider (ISP) account. A downside to this wide scale public accessibility is that it permits easy access for hackers and others intent on carrying out malicious activities against one or more hosts on the Internet. Illegal conduct such as stealing of secret information or the deletion of important files by a malicious user is possible by a hacker that manages to break into a computer on a remote network and succeed to tap communication data. The need for security was addressed by the Internet Architecture Board (IAB) by including security features in IPv6 such as encryption and authentication in that permit secure transactions over the Internet.

To combat the threat of hackers and to secure private networks, it is common today to place a firewall at the entrance of the private network in a company or organization. The firewall employs some form of packet filter that functions to enforce a user defined security policy. The firewall is a system that sits at the boundary between the local network of the organization and the global Internet. It implements the filtering of all data communications in order to prevent leakage of information out to the external network and to prevent unauthorized access of the internal network from the outside. A deny/allow decision is made for each packet that is received by the firewall.

At the same time, the world is witnessing increasing demand for wireless services (i.e. cellular phones, two way pagers, cordless devices, etc.) and personal computing devices such as laptops, PDAs, etc. Many of these personal computing devices incorporate wireless communications circuitry to enable them to communicate via wireless networks (e.g., cellular or other broadband schemes) to WAN networks such as the Internet. Thus, more and more PDAs and cellular telephones are being connecting to the Internet thus exposing these devices to security risks. Preferably, these devices employ some type of firewall to protect against unauthorized access to the device. Most firewalls today, however, are implemented in software and require the computing resources of an entire desktop computer, making their use in a portable computing device such as cellular telephone or PDA impractical.

Thus, there is a need for a firewall or packet filter that can be easily implemented in small size suitable for incorporated in small portable computing devices such as cellular telephones and wireless connected PDAs.

SUMMARY OF THE INVENTION

The present invention provides a novel and useful dynamic packet filter that can be implemented in hardware, software or a combination of both. The present invention can be incorporated in a hardware-based firewall suitable for use in portable computing devices such as cellular telephones and wireless connected PDAs that are adapted to connect to the Internet.

The invention performs dynamic packet filtering on packets receive over an input packet stream. Preferably, the invention is positioned between a WAN (i.e. the Internet) and a local LAN. In this case, the dynamic packet filter is operative to filter both inbound packets from WAN to LAN and outbound packets from LAN to WAN. Note that dynamic filtering is effective to check dynamic protocol behavior rather than the static rules of a protocol. The invention achieves this by creating sessions to track the state of communications between the source and destination.

New sessions are detected, created and data related thereto is stored in a session database. An attempt is made to recognize each received packet and associate it with a previously opened session. Recognition of a session is accelerated by use of a hash table to quickly determine the corresponding session record in the session database. The hash can be calculated using either complete or partial socket information. Complete socket information comprises the 104-bit source and destination IP address, source and destination port number and protocol. Partial socket information, termed a hole, is missing one or more items of information. A hole database is used to store the holes that are currently opened. Once a hole session is recognized, the hole is filled with the missing parameters.

If the received packet cannot be associated with an open session, a new session is created. If an existing session is found, the session related data is read from the session database and the received packet is checked against a set of rules. The rules are described as state transition diagrams that specify the states and transitions permitted by the particular protocol.

If a packet conforms to the legal behavior for the protocol, it is allowed, otherwise, it is denied. The session data is then updated with new state information and related parameters and written back into the session database.

Although the invention is intended for implementation in hardware, it can also be implemented in software. In one embodiment, a computer comprising a processor, memory, etc. is operative to execute software adapted to perform the dynamic packet filtering method of the present invention.

There is thus provided in accordance with the present invention a method of filtering an input packet stream, the method comprising the steps of establishing a session database adapted to store session related data for a plurality of sessions, each session corresponding to a socket, opening a new session upon receipt of a socket not previously stored in the session database, recognizing a session associated with a received packet in accordance with its associated socket, processing the session data corresponding to the received packet in accordance with a plurality of predefined rules to generate processing results and deciding whether to allow or deny the received packet in accordance with the processing results.

There is also provided in accordance with the present invention a method of monitoring the state of a communications session, the method comprising the steps of establishing a session database adapted to store session related data for a plurality of sessions, each session corresponding to a socket, recognizing a session in accordance with a first hash calculation on the socket associated with a received packet, recognizing a hole session in accordance with a second hash calculation on a partial socket associated with the received packet, reading session data from the session database, the session data associated with either a recognized session or a recognized hole session, tracking a connection state of the session and checking the state against a plurality of rules to determine whether to allow or deny the received packet and writing updated session data back into the session database.

There is further provided in accordance with the present invention a dynamic filter for filtering an input packet stream comprising a session database adapted to store session related data for a plurality of sessions, each session corresponding to a socket, a session recognition module adapted to search the session database for a session whose associated socket matches that of a received packet, a session management module adapted to maintain the session database including adding, deleting and modifying sessions in the session database and a main filter module operative to track a connection state of the session corresponding to a receive packet and checking the connection state against a plurality of rules to determine whether to allow or deny the received packet.

There is also provided in accordance with the present invention a digital computing apparatus, comprising communication means adapted to connect the apparatus to a wide area network (WAN), memory means comprising volatile and non-volatile memory, the non-volatile memory adapted to store one or more application programs, a processor coupled to the memory means and the communication means for executing the one or more application programs and a dynamic filter for filtering an input packet stream comprising a session database adapted to store session related data for a plurality of sessions, each session corresponding to a socket, a session recognition module adapted to search the session database for a session whose associated socket matches that of a received packet, a session management module adapted to maintain the session database including adding, deleting and modifying sessions in the session database and a main filter module operative to track a connection state of the session corresponding to a receive packet and checking the connection state against a plurality of rules to determine whether to allow or deny the received packet.

There is still further provided in accordance with the present invention a computer readable storage medium having a computer program embodied thereon for causing a suitably programmed system to search for a plurality of strings by performing the following steps when such program is executed on the system: establishing a session database adapted to store session related data for a plurality of sessions, each session corresponding to a socket, opening a new session upon receipt of a socket not previously stored in the session database, recognizing a session associated with a received packet in accordance with its associated socket, processing the session data corresponding to the received packet in accordance with a plurality of predefined rules to generate processing results and deciding whether to allow or deny the received packet in accordance with the processing results.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
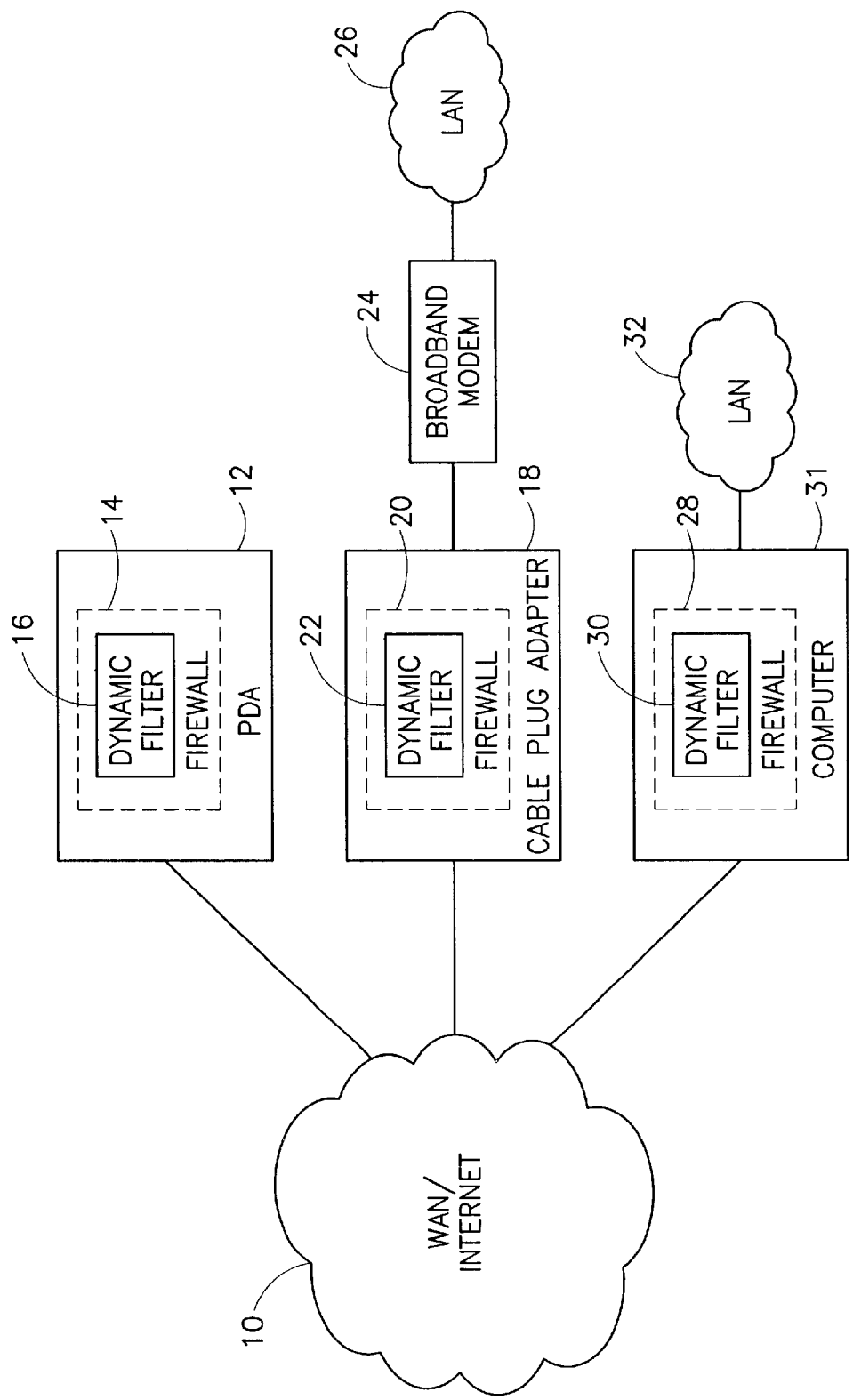
FIG. 1 is a block diagram illustrating several example applications of the dynamic packet filter of the present invention in the context of a WAN or Internet.

The following notation is used throughout this document.

| Term | Definition |
| --- | --- |
| ADSL | Asymmetric Digital Subscriber Line |
| ARP | Address Resolution Protocol |
| ASIC | Application Specific Integrated Circuit |
| CPU | Central Processing Unit |
| DAT | Digital Audio Tape |
| DSL | Digital Subscriber Line |
| DSP | Digital Signal Processor |
| DVD | Digital Versatile Disk |
| EEPROM | Electrically Erasable Programmable Read Only Memory |
| EEROM | Electrically Erasable Read Only Memory |
| EPROM | Erasable Programmable Read Only Memory |
| FPGA | Field Programmable Gate Array |
| FTP | File Transfer Protocol |
| HDSL | High bit rate Digital Subscriber Line |
| HTML | Hyper Text Markup Language |
| IAB | Internet Architecture Board |
| ICMP | Internet Control Message Protocol |
| IP | Internet Protocol |
| ISP | Internet Service Provider |
| LAN | Local Area Network |
| LRU | Least Recently Used |
| NIC | Network Interface Card |
| OSI | Open Systems Interconnect |
| PC | Personal Computer |
| PDA | Personal Digital Assistant |
| PDU | Protocol Data Unit |
| RAM | Random Access Memory |
| ROM | Read Only Memory |
| TCP | Transmission Control Protocol |
| UDP | User Datagram Protocol |
| VDSL | Very high bit rate Digital Subscriber Line |
| WAN | Wide Area Network |
| WWW | World Wide Web |

DETAILED DESCRIPTION OF THE INVENTION

The present invention provides a novel and useful dynamic packet filter that can be implemented in hardware, software or a combination of both. The present invention can be incorporated in a hardware-based firewall suitable for use in portable computing devices such as cellular telephones and wireless connected PDAs that are adapted to connect to the Internet.

The invention performs dynamic packet filtering on packets received over an input packet stream. Preferably, the invention is positioned between a WAN (i.e. the Internet) and a local LAN. In this case, the dynamic packet filter is operative to filter both inbound packets from WAN to LAN and outbound packets from LAN to WAN. Note that dynamic filtering is effective to check dynamic protocol behavior rather than the static rules of a protocol. The invention achieves this by creating sessions to track the state of communications between the source and destination.

Note that the input stream may comprise any type of input data in accordance with the particular application, such as frames, packets, bytes, PDUs, etc. For illustration purposes only, the input data stream is considered as a sequence of packets.

It is appreciated that the dynamic packet filter illustrated is presented as an example only and is not intended to limit the scope of the invention. One skilled in the relevant arts can construct other dynamic packet filters, either in hardware, software or a combination of both to perform dynamic packet filtering using the principles of the present invention described herein without departing from the scope of the invention.

The dynamic filter of the present invention is operative to maintain a connection table referred to as a session database for monitoring the state of a communications session. A new session is added to the session database if it passes a static security policy rule. Once a session is created, subsequent packets corresponding to this session are inspected in accordance with the session state for the particular protocol associated with the packet. The packet is allowed only if the packet conforms to the specifications of the particular protocol.

The dynamic filter of the present invention has widespread application in many different types of systems. A block diagram illustrating several example applications of the dynamic packet filter of the present invention in the context of a WAN or Internet is shown in FIG. 1. Typically, the dynamic filter is constructed as a part of a firewall used to prevent unauthorized access to a protected network, as is shown in each of the three examples shown herein.

In the first example, the dynamic filter 16 is one component in a firewall 14 that is implemented in some form of personal computing device 12 in wired or wireless communication with a network 10 such as a WAN or the Internet. The personal computing device may comprise any device, such as a Personal Digital Assistant (PDA), e.g., Palm handheld, a cellular telephone, wireless handset, etc. In this example, the dynamic filter/firewall functions to bidirectionally filter packets between the Internet and the device.

In a second example, the dynamic filter 22 is one component in a firewall 20 that is implemented in a cable plug adapter 18 in wired or wireless communication with the WAN or Internet 10. The device 18 sits between the Internet and a broadband modem 24 which functions to connect a LAN 26 to the Internet. The dynamic filter in the cable plug adapter functions to filter packets sent from the Internet to the LAN and vice versa. The broadband modem is adapted to modulate and demodulate a broadband signal such as xDSL, e.g., ADSL, HDSL, VDSL, etc., satellite, land based RF, microwave, etc.

In a third example, the dynamic filter 30 is one component in a firewall 28 that is implemented on a stand alone computer 31, e.g., personal computer (PC), in wired or wireless communication with the WAN or Internet. The computer containing the firewall is located between the Internet and the LAN 32 to be protected. The dynamic filter in the firewall functions to filter packets sent from the Internet to the LAN and vice versa.

Figure 2:
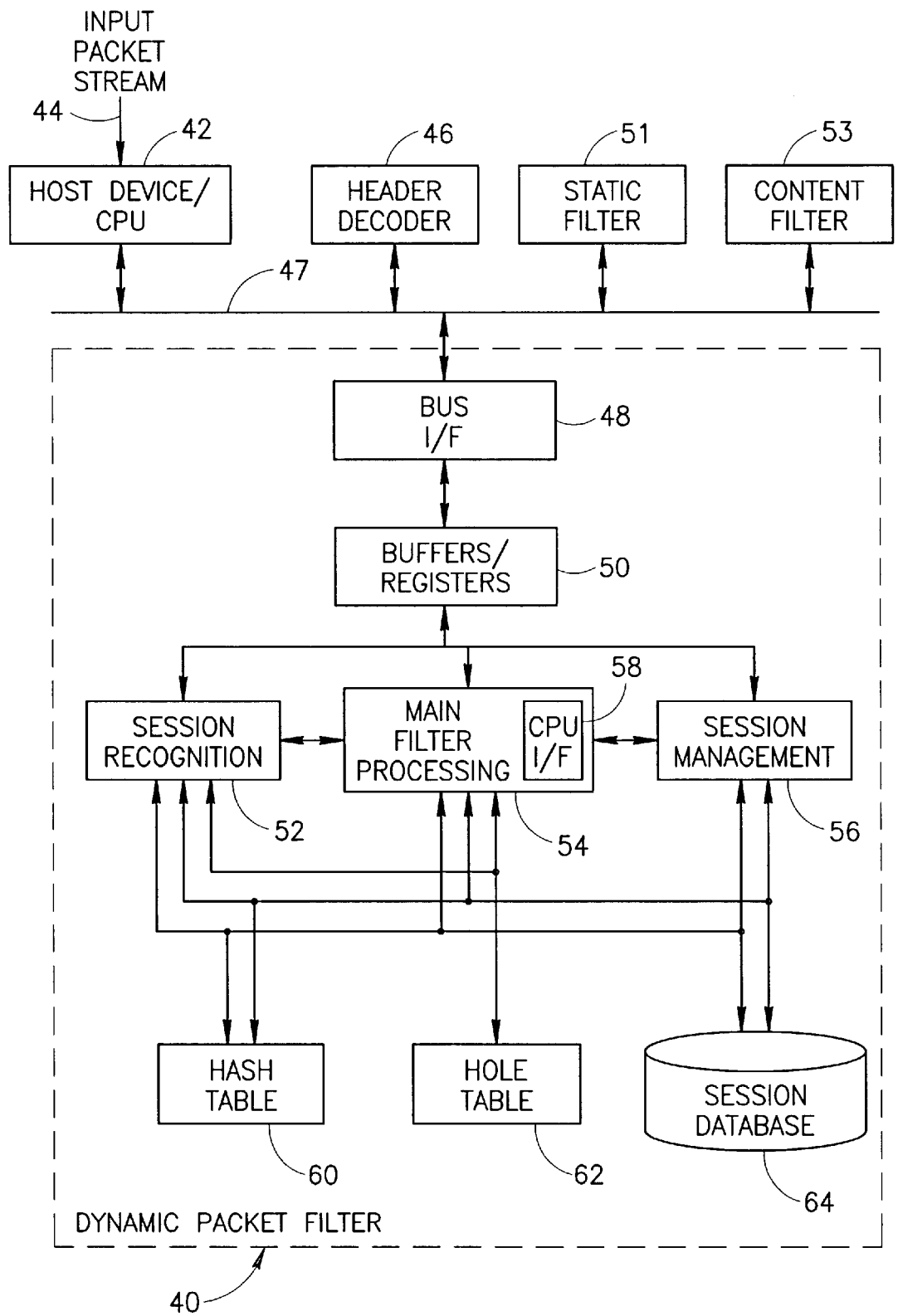
FIG. 2 is a block diagram illustrating the dynamic packet filter of the present invention in more detail.

The dynamic filter will now be described in more detail. A block diagram illustrating the dynamic packet filter of the present invention in more detail is shown in FIG. 2. The dynamic filter, generally referenced 40, comprises a bus interface 48, buffer/registers 50, a session recognition module 52, main filter processing module 54, session management module 56, hash table 60, hole table 62 and session database 64. The dynamic filter communicates with a host device/CPU 42, header decoder 46, static filter 51 and content search unit 53 over a bus 47 via the bus interface.

Note that throughout this document, it is assumed that the dynamic filter is located between a WAN and LAN and is operative to filter packets in both directions. The term inbound packets refer to packets received from the WAN towards the LAN and the term outbound packets refer to packets received from the LAN towards the WAN. Thus, the input packet stream may comprise inbound and outbound packets.

The input packet stream 44 is received from the CPU and the contents thereof are forwarded to the header decoder which functions to decode (or parse) the header portion of the packet. The header decoder is operative to extract the fields of interest that are used by the dynamic filter. The data extracted by the header decoder is forwarded to the dynamic filter over the bus. The data includes a hash value (if calculated by the CPU), 104 bit socket data including 32 bit source and destination IP address, 16 bit source and destination port and 8 bit protocol, dynamic function value indicating the type of layer 4 packet, e.g., ICMP, ARP, TCP, UDP, etc. for the TCP protocol, it also includes 32 bit sequence number, 32 bit acknowledge, 11 bit payload length and 16 bit window size. Note that depending on the implementation, the header decoder may be constructed as an external module or may be integral with the dynamic filter.

Each type of layer 4 packet is represented by a different dynamic function value. This value is used by the dynamic filter to select the appropriate hardware machine to use when processing the received packet so as to track the session state and verify its legality. The payload length is calculated by the header decoder and forwarded to the dynamic filter. It is calculated by subtracting from the total length field in the IP packet, the sum of the IP header and the length in the TCP header.

The main filter processor comprises the CPU interface 58 and functions as the main processing block of the dynamic filter. It opens new sessions, processes existing sessions and tracks the state of a session while verifying legal, i.e. permitted, state changes in accordance with the particular protocol. The session recognition module functions to receive a socket and search in the session database for an open session matching the socket. The session management module functions to maintain a hash linked list and a least recently used (LRU) linked list whereby sessions are added to and deleted from the lists. The session database functions to store the socket and other session related data, including session state and current status, for use by the various processing modules of the dynamic filter. The hash and hole tables are used to accelerate the recognition of sessions. These components are described in more detail infra.

Main Filter Processing

Figure 3:
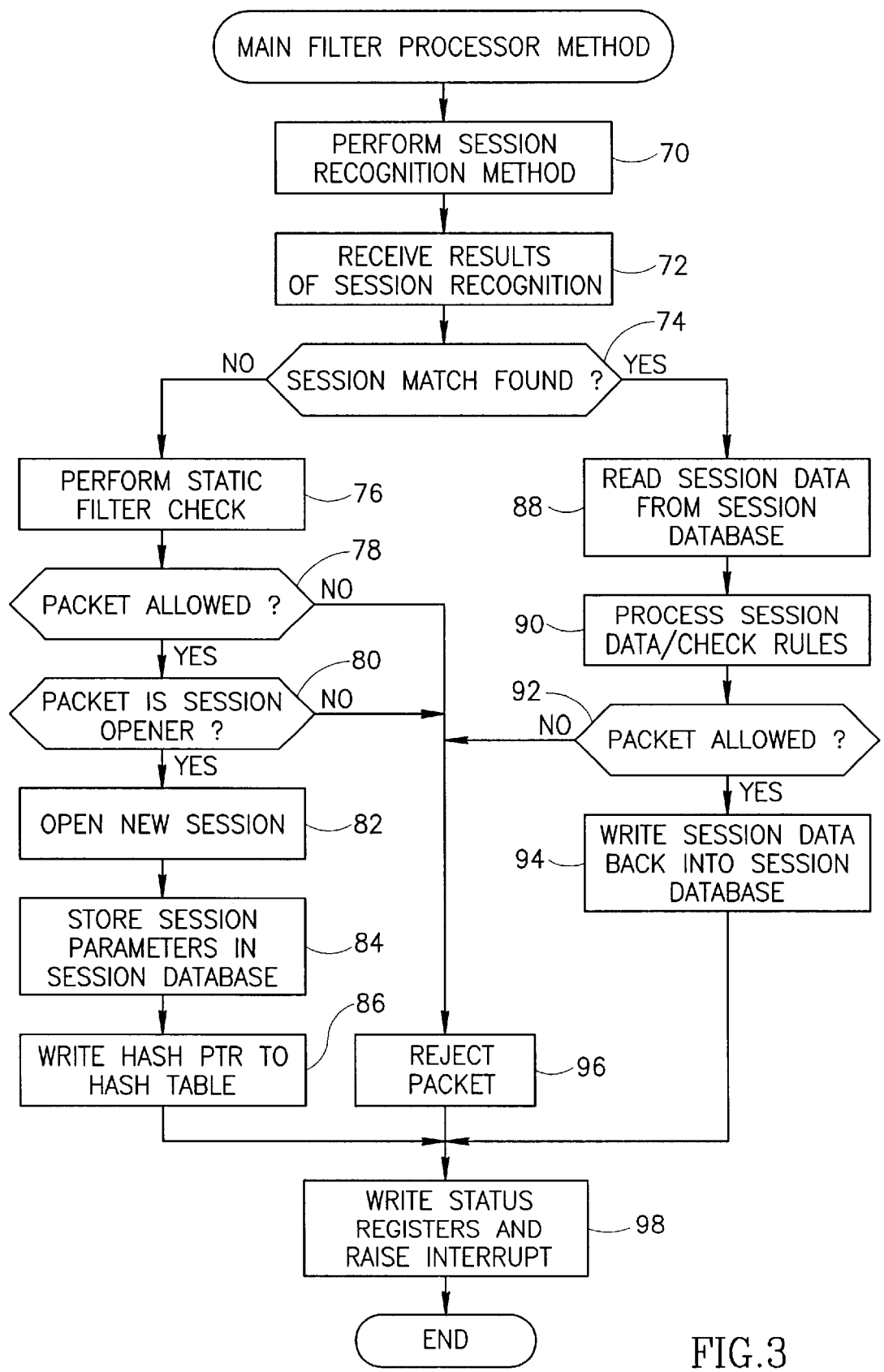
FIG. 3 is a flow diagram illustrating the main filter processor method of the present invention.

The main filter processing will now be described in more detail. A flow diagram illustrating the main filter processor method of the present invention is shown in FIG. 3. The dynamic filter is constructed to process packet data in three stage wherein session data associated with the packet is read from the session database in one stage, the data then processed in a second stage and the results of the processing written back to session database in a third stage. During the processing stage, the session state is tracked against predefined rules and a decision is made whether to allow or deny the packet.

First, session recognition is performed (step 70) whereby the session database is searched for a socket matching that of the received packet. The results of the recognition are returned to the main filter processor (step 72). If a match was not found (step 74), a static rules check is performed using a static filter (step 76). The static filter, which may or may not be part of the dynamic filter, functions to perform a static check of the received packet against a set of static rules corresponding to different protocols. Packet static rules checking is well known in the communications arts and is therefore not elaborated upon herein.

If the result of the static rules check is to deny the packet, i.e. the packet violates one or more protocol rules (step 78), the packet is rejected (step 96). If the result of the static rules check is to allow the packet, it is checked whether the packet is a session opener (step 80). A packet is a session opener if it is a packet that can logically open a session. For example, a reply packet cannot open a session, a TCP packet must be a SYN packet to open a session, etc. If the packet is not a session opener, it is rejected (step 96).

if the packet is a valid session opener, a new session is created (step 82). The session related data and parameters are stored in the session database (step 84). A hash pointer to the new session is then calculated and stored in the hash table (step 86). The hash pointer is used to quickly find the session during the recognition stage.

If a session having a socket matching that of the received packet is found (step 74), the session data is read from the session database (step 88) and the session data then processed (step 90). The dynamic rules associated with the particular packet protocol are checked and a determination of whether to allow or deny the packet is made. The session state is tracked and checked against the permitted behavior for the particular protocol. In accordance with the invention, the dynamic rules checking is performed in hardware rather than software. Alternatively, the dynamic rules may be checked via software means as well.

If the packet is denied (step 92), the packet is rejected (step 96). If it is allowed, the updated session data with the updated session tracking state is written back into the session database (step 94).

Following either a session opener, rejection of a packet or an allowance of a packet, one or more status registers are written to and an interrupt is raised signaling the completion of the main filter processing to the CPU or other host device (step 98).

Figure 4:
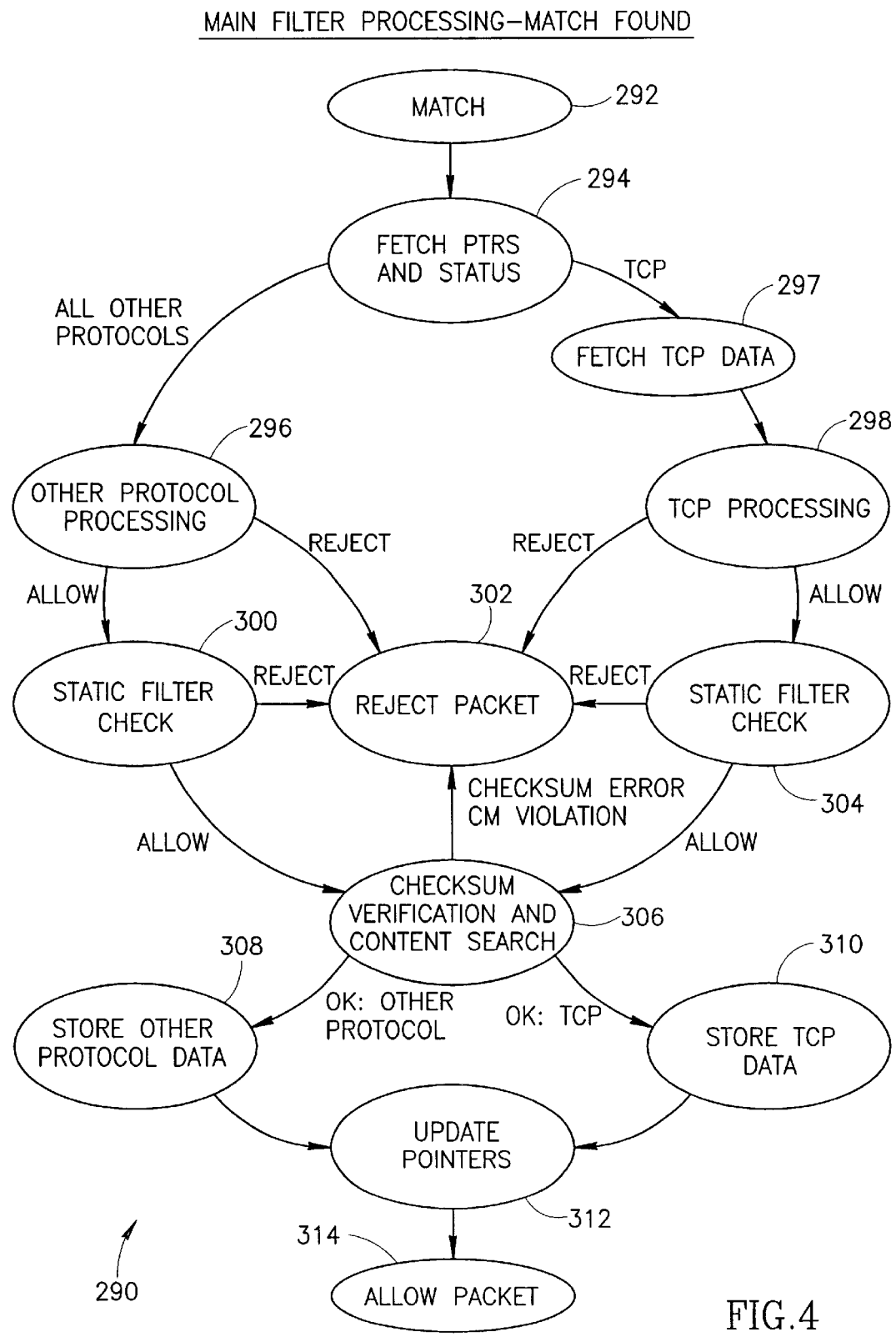
FIG. 4 is a state transition diagram illustrating the main filter processor method of the present invention when a match is found.

A state transition diagram illustrating the main filter processor method of the present invention when a match is found is shown in FIG. 4. The state transition diagram, generally referenced 290, comprises a plurality of transitions and states that implement the logic of the main filtering processing when a match is found. The process begins in the match state 292 and moves to the fetch pointers and status state 294. In this state the pointer and status data associated with the session are fetched.

if the session is a TCP session, the TCP related data is fetched from the session database (state 297). The process then moves to the TCP processing state 298. The processing performed comprises tracking the TCP session state and checking whether the session behavior is legal, as described in more detail infra. The packet may be rejected (state 302 or allowed wherein processing continues with waiting for the static filtering check to complete (state 304). The static filtering is performed outside the dynamic filter using any well known static filtering technique. The static filter check may reject the packet (state 302) or may allow the packet whereby the process waits for the content machine to complete searching the payload for valid strings and waits for the checksum verification to complete (state 306). If the checksum verification passed and a valid string was found, the TCP parameters arc updated and stored in the session database (state 310). The session pointers are then updated (state 312) and the packet allowed (state 314). If the checksum verification returns a checksum error or the content machine finds an invalid string, the packet is rejected (state 302). Invalid strings comprise strings found by the content machine that are not permitted for one or more reasons, e.g., they indicate the presence of virus, non-permitted commands such as the FTP DELETE command, etc. Valid strings comprise either permitted strings or no matching strings. A content machine suitable for use with the present invention described in more detail in U.S. application Ser. No. 09/790,064, filed Feb. 21, 2001, entitled "Apparatus for and Method of Multiple Parallel String Searching," similarly assigned and incorporated herein by reference in its entirety.

Similar processing is performed for protocols other than TCP. If the session is a non-TCP session (e.g., UDP, ARP, ICMP, etc.), the other protocol processing state 296 is entered. The processing performed comprises tracking the connection state and checking whether the session behavior is legal for the particular protocol, as described in more detail infra. The packet may be rejected (state 302) or allowed wherein processing continues with waiting for the static filtering check to complete (state 300). The static filter check may reject the packet (state 302) or may allow the packet whereby the process waits for the content machine to complete searching the payload and waits for the checksum verification to complete (state 306). If the checksum verification passed and a valid string was found, the parameters of the particular protocol are updated and stored in the session database (state 308). The session pointers are then updated (state 312) and the packet allowed (state 314). If the checksum verification returns a checksum error or the content machine finds an invalid string, the packet is rejected (state 302).

Figure 5:
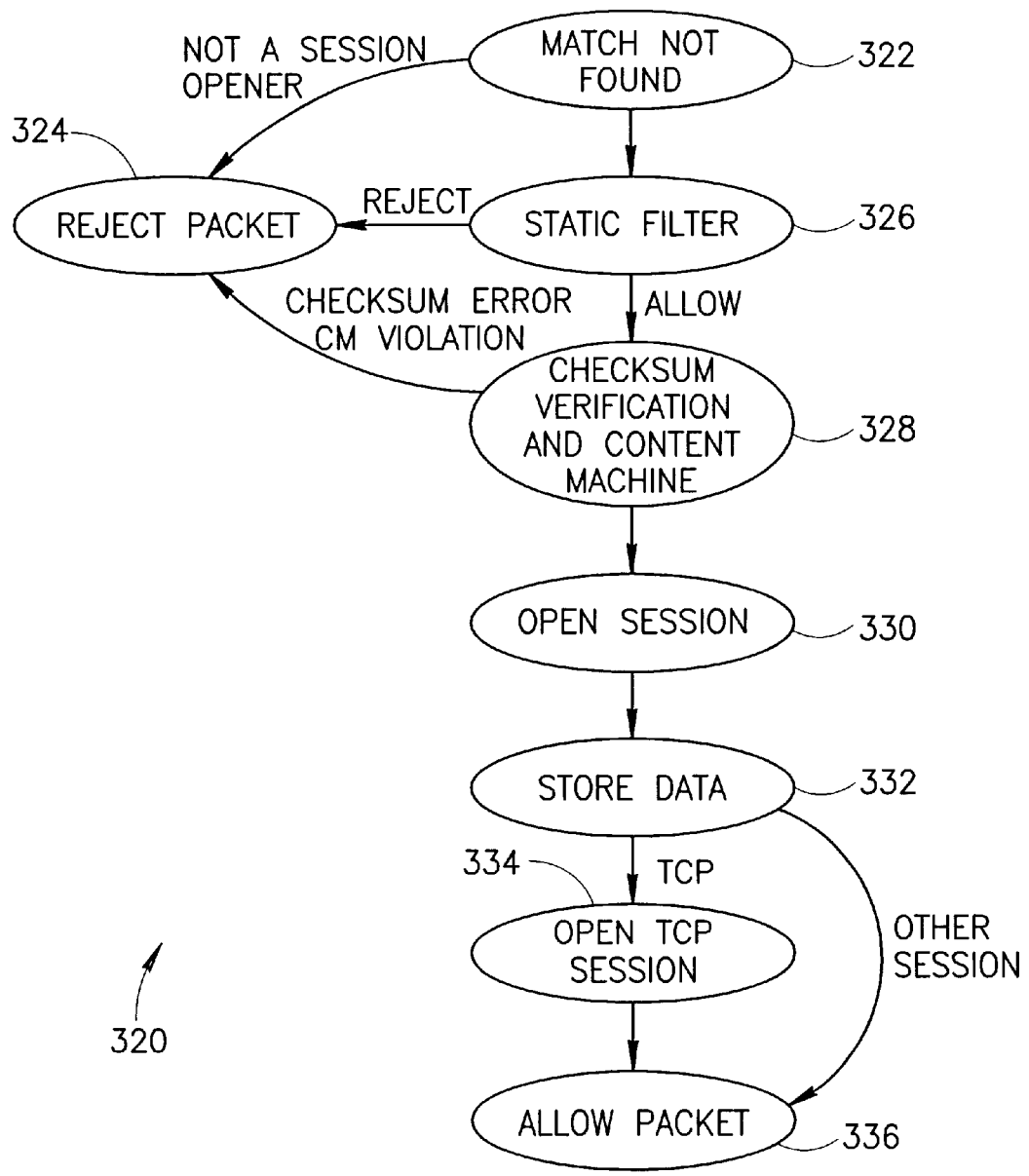
FIG. 5 is a state transition diagram illustrating the main filter processor method of the present invention when a match is not found.

A state transition diagram illustrating the main filter processor method of the present invention when a match is not found is shown in FIG. 5. The state transition diagram, generally referenced 320, comprises a plurality of transitions and states that implement the logic of the main filtering processing when a match is not found. The process begins in the match not found state 322 and moves to the wait for static filter determination state 326 if the session is a session opener. If the session is not a session opener, the packet is rejected (state 324).

If the static filter allows the packet, the process waits for the content machine and for the checksum verifier to complete checking (state 328), otherwise the packet is rejected (state 324). If the content machine check finds an invalid string or the checksum verification reveals a checksum error, the packet is rejected (state 324). If the checksum verification and content machine search completes without errors, a session is opened and the socket data is stored in the session database (state 330). The status, timestamp and state of the connection are also stored in the session database (state 332). If the session is a non-TCP session, the packet is allowed (state 336). In the case of a TCP session, a TCP session is opened (state 334) and the packet then allowed (state 336).

In accordance with the invention, the dynamic filter is suitable for implementation in hardware adapted to perform session tracking processing in parallel for all supported protocols. During fetching of the session data in the event of a socket match, the data previously fetched is processed in parallel. Once the data is fetched, all session checking for the various protocols is performed in a single clock cycle. Thus, the hardware implementation of the invention greatly accelerates the packet filtering process.

Session Recognition

Figure 6:
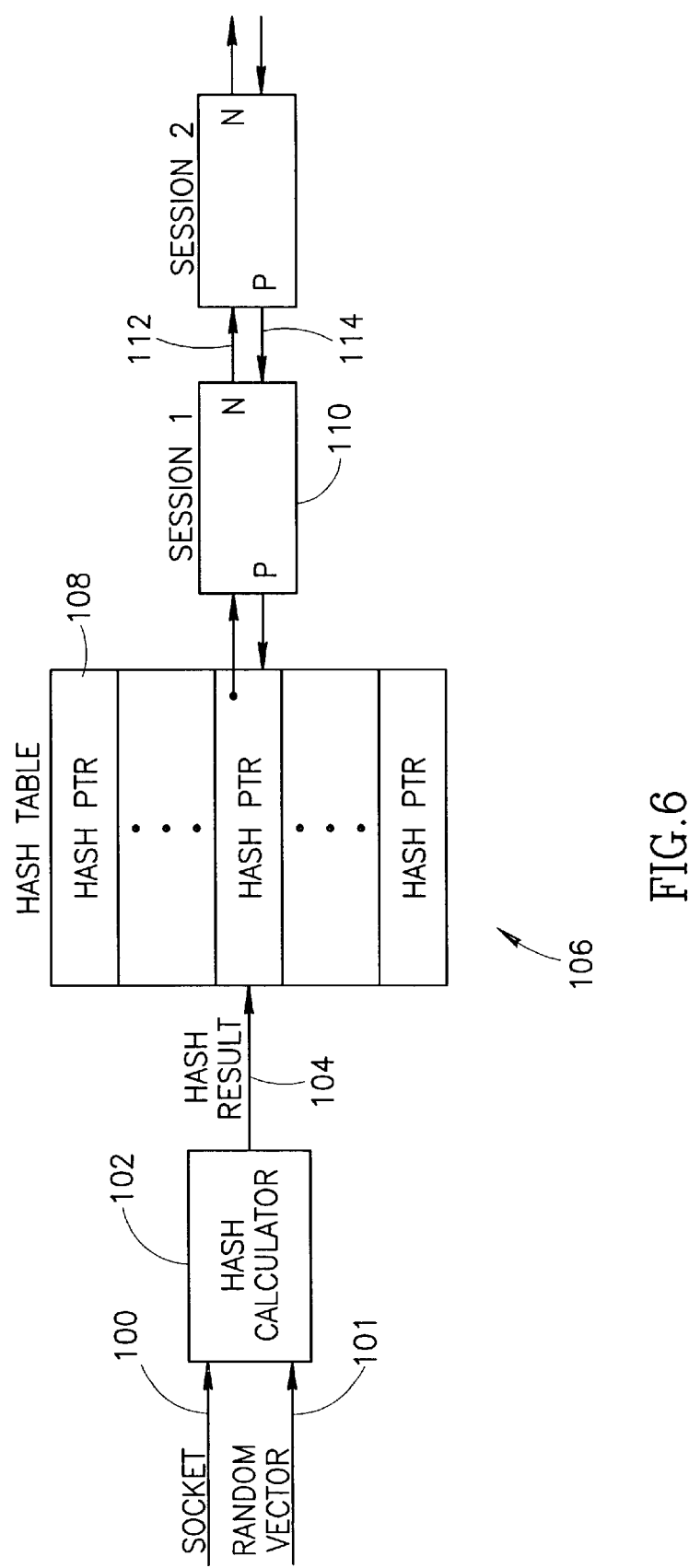
FIG. 6 is a diagram illustrating the hashing technique of determining the session associated with an input packet.

The session recognition process will now be described in more detail. A diagram illustrating the hashing technique of determining the session associated with an input packet is shown in FIG. 6. Each session corresponds to a unique socket. A session is identified by comparing the received packet's socket to the sockets associated with previously opened sessions stored in the session database. To speed the recognition of a session, a hash table is used which stores hash pointers to session records in the session database and permits rapid lookup of the session corresponding to a received socket.

New sessions are stored in the session database and a hash on the socket is calculated, either by the dynamic filter or the CPU. A hash pointer is stored at a location in the hash table 60 (FIG. 2) pointed to by the hash result. If more than one session is stored at that location, the session is added to a linked list. Note that initially, each entry in the hash table is initialized to NULL.

Upon receipt of a packet, the socket 100 is input to the hash calculator 102 which functions to generate and output a hash result 104. The hash result is used as the index to the hash table 106 that comprises a plurality of entries 108 each containing a hash pointer. The hash pointer points to a linked list of sessions 110 in the session database. Each session record in the session database comprises previous 114 and next pointers 112 thus implementing a doubly linked list. If a hit on the socket occurs, each session in the linked list must be checked for a match with the socket of the received packet.

Preferably, the hash function is chosen to produce as even a spread as possible of hash results across the hash table. The hash function may be any suitable function, such as an XOR function or CRC. In one embodiment, performance can be improved over a simple XOR hash function by using a random vector in calculating the hash result in accordance with the following equation.

$$\begin{bmatrix} SOCK_1 \\ SOCK_2 \\ SOCK_3 \\ \vdots \\ SOCK_N \end{bmatrix}_{1 \times N} \otimes \begin{bmatrix} RV_1 & RV_2 & RV_3 & \cdots & RV_N \\ RV_2 & RV_3 & RV_4 & \cdots & RV_{N-1} \\ RV_3 & RV_4 & RV_5 & \cdots & RV_{N-2} \\ \vdots & \vdots & \vdots & \cdots & \vdots \\ RV_R & RV_{R+1} & RV_{R+2} & \cdots & RV_{R+N-1} \end{bmatrix}_{N \times R} = \begin{bmatrix} OUT_1 \\ OUT_2 \\ OUT_3 \\ \vdots \\ OUT_R \end{bmatrix}_{1 \times R} \quad (1)$$

wherein the operator $\otimes$ is defined as follows $$OUT_i = (RV_{i1} \text{ AND } SOCK_1) \oplus (RV_{i2} \text{ AND } SOCK_2) \oplus \ldots \oplus (RV_{iN} \text{ AND } SOCK_N) \quad (2)$$

and $OUT_i$ represents the $i^{th}$ byte of the output matrix;

$SOCK_k$ represents the $k^{th}$ byte of the input matrix;

$RV_{ik}$ represents the i,j byte of the random vector matrix;

$\oplus$ indicates the XOR function;

The input socket data is thus generated using the random vector and the input socket data.

Figure 7:
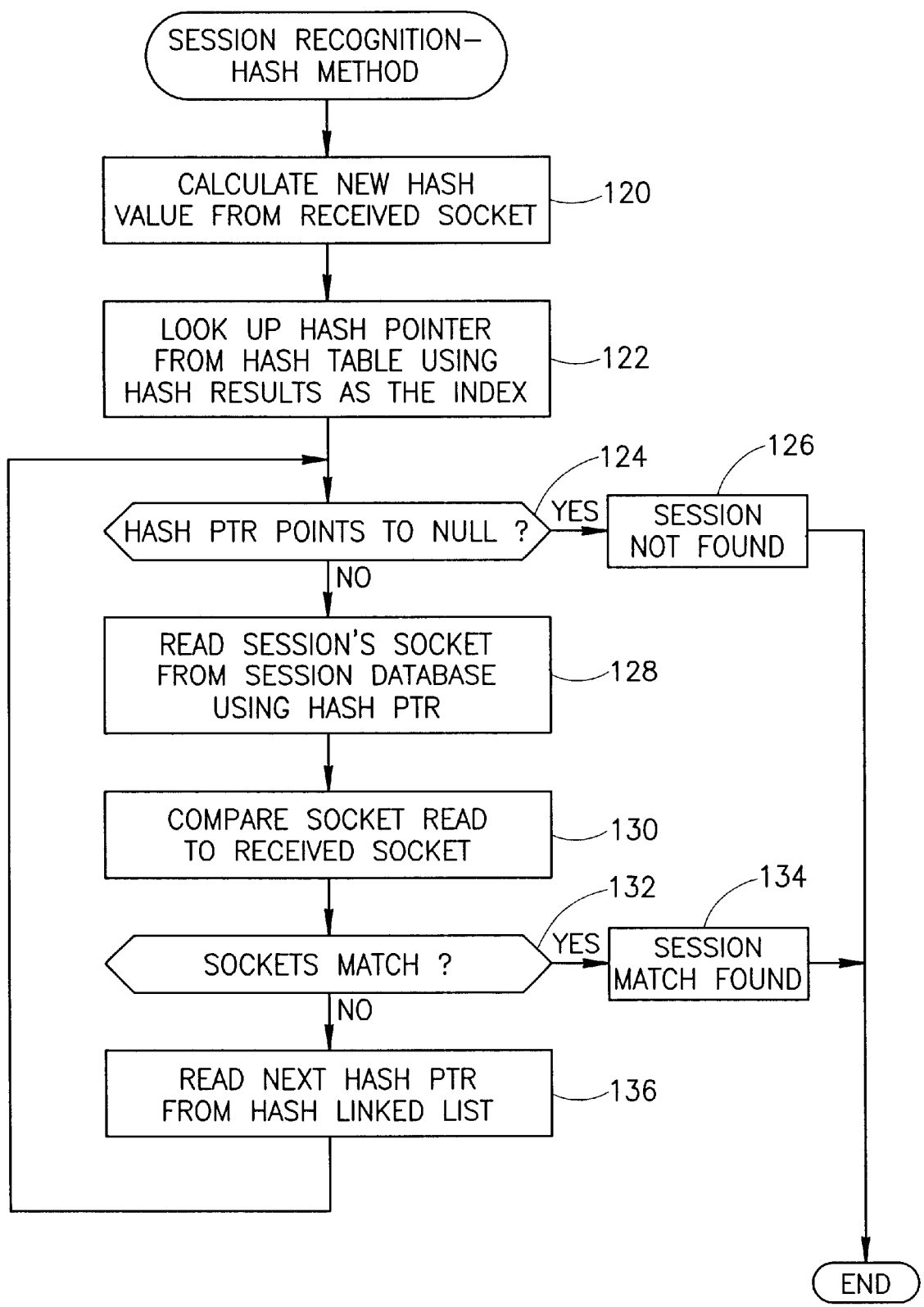
FIG. 7 is a flow diagram illustrating the hashing method of the session recognition process of the present invention.

A flow diagram illustrating the hashing method of the session recognition process of the present invention is shown in FIG. 7. The first step is to calculate a hash value from the socket in the received packet such as in the manner described above (step 120). The R byte hash result is used as the index into the hash table to retrieve the hash pointer corresponding to the socket (step 122). If the hash pointer points to NULL (step 124), then there is no session and 'session not found' is returned to the main filter process (step 126).

If the hash pointer is not NULL, the session's socket is read from the session database (step 128) and compared to the socket in the received packet (step 130). If the sockets match (step 132), a session match is found (step 134) and reported to the main filter process. If the sockets do not match (step 132), the next hash pointer is read from the linked list (step 136) and the method repeats from step 124 until either the last hash pointer points to NULL or a match is found.

Note that a full compare on the socket is always performed even in the event only one session is stored in the linked list. Note also that the scope of the invention is not limited by which entity updates and maintains the linked list, i.e. either the dynamic filter or the CPU. The depth of the hash table can be any desired value. Typically, however, the depth is set in accordance with the number of sessions to be tracked simultaneously. Preferably, the number of hash entries is two or four times the number of sessions since it is not desirable to have many duplicates due to the time consuming nature of the full socket compare.

In accordance with the present invention, the session recognition module comprises the capability of searching for sessions using partial socket data. Partial socket data, termed a hole, comprises any socket wherein one or more items of information are missing, i.e. any combination of one or more of the five elements making up a socket (source and destination IP address, source and destination port and protocol). A hole refers to an opening made in the firewall/dynamic filter to allow subsequent packets to pass through even though they will not pass the static filter rule base. A packet associated with a hole may have zero or more parameters missing in its associated socket. Sockets with one or more missing parameters are placed in a hole table and a hole search is performed.

The hole search method is a secondary search method performed by the session recognition module in response to not finding a session match using the complete socket matching method described in connection with FIG. 7. Holes are not desirable and once established, the CPU and dynamic filter attempt to 'fill' them upon receipt of the first packet yielding a partial socket match.

A hole table 62 (FIG. 2) is used to store hole information typically provided by the software in processing layers 5 and higher. In the case where a socket comprises 5 items, the hole table comprises 32 records (0 through 31). For example, in processing FTP packets, IP telephony related packets, etc. one or more parameters from the socket are not known initially. In these cases, the CPU opens a hole in the hole table at a location corresponding to the missing parameters.

Note that the entry 31 (i.e. all ones) in the hole table is not used since it represents no missing parameters. Each entry in the hole table has the fields listed below Table 1.

TABLE 1

Hole table fields

| Field | Description |
| --- | --- |
| LAN | The hole is expected to be closed from the LAN side, i.e. a packet from the LAN is supposed to match this hole type. |
| WAN | The hole is expected to be closed from the WAN side, i.e. a packet from the WAN is supposed to match this hole type. |
| EH | Existing hole. The number in this field represents the number of existing holes currently opened having this type. |
| PEHT | Previous Existing Hole type. A pointer to a previous hole type in the double linked list of existing holes. |
| NEHT | Next Existing Hole type. A pointer to a next hole type in the double linked list of existing holes. |

In the example provided herein, the hole type is defined as five bits corresponding to five possible missing parameters: bit 4—protocol; bit 3—remote port; bit 2—local krt; bit 1—remote IP; bit 0—local IP. Thus, for example hole type '11011' corresponds to the local port parameter missing.

The hash method described hereinabove, requires complete socket information in order to generate the hash value. If the packet received is one that should 'fill' a hole, the session recognition-using HASH method (FIG. 7) will result in a match not found and the hole cannot be filled. The 'hole' session could not be found because the HASH is calculated on the entire socket of the received packet while the entry in the HASH table that points to the hole session was calculated on the partial pre-known sockets.

The hole table solves this problem by storing hole information that is written by the CPU and read by the dynamic filter. A hole is a session opened by an external process that performs dynamic filtering on the application layer. Note that the CPU is adapted to initially calculate the partial hash value and store it in the hash table, since the CPU is the entity to first detect the existence of a hole. The first packet whose partial socket matches that of the database, will close the hole, since the missing parameters can be determined from the received packet. The hole table comprises 32 entries, each corresponding to a unique combination of one or more missing parameters, wherein each 'bit' represents one of the five parameters making up the socket.

Each entry stores a field indicating the number of holes of that particular kind and next and previous pointers to other entries. Thus, the next and previous pointers form a linked list of holes. A first_valid_entry register stores a pointer to the first entry in the list. A NULL in this register indicates that no holes are stored in the session database. The last entry stores a NULL pointer to indicate the end of the list.

Figure 8:
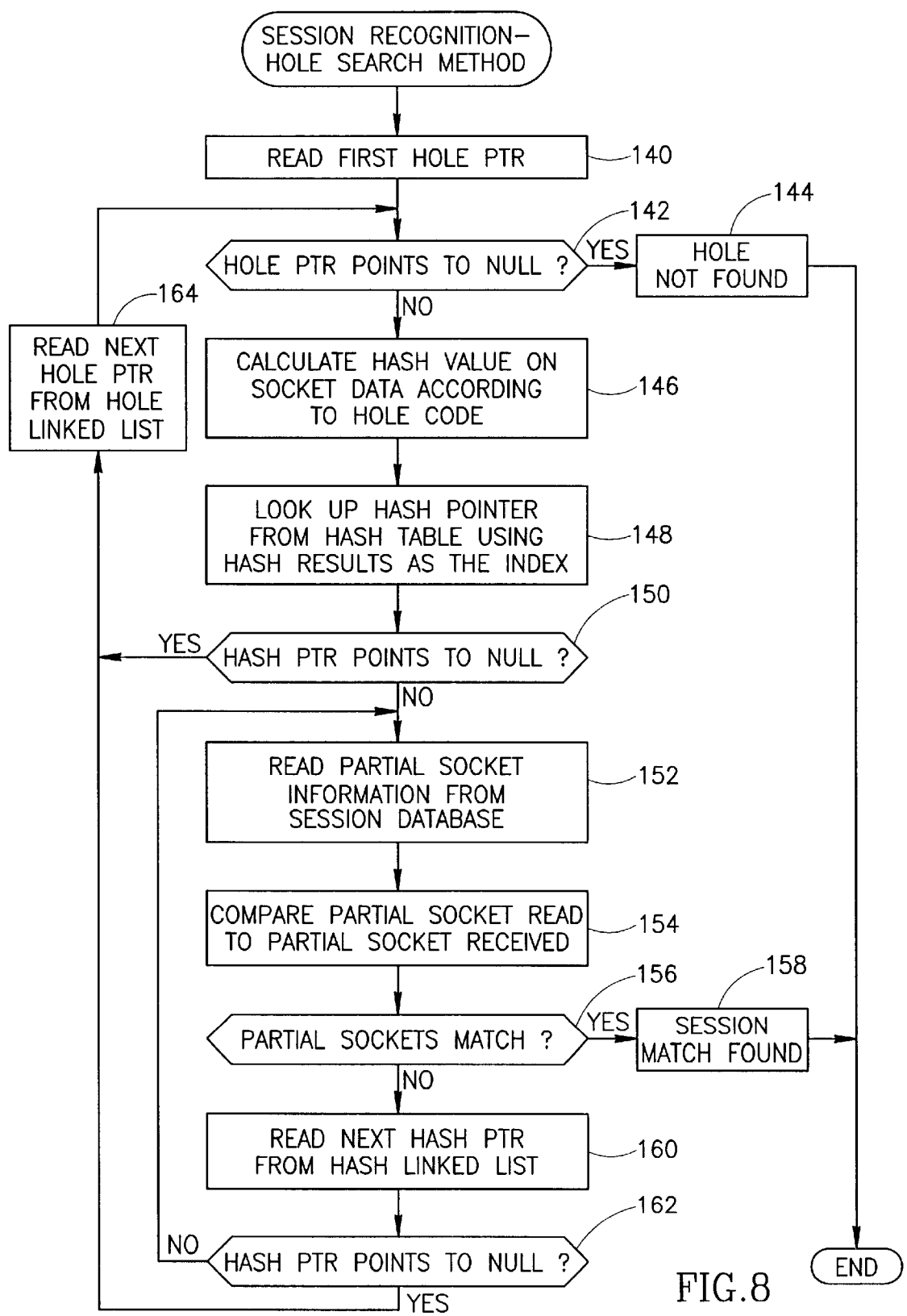
FIG. 8 is a flow diagram illustrating the hole search method of the session recognition process of the present invention.

A flow diagram illustrating the hole search method of the session recognition process of the present invention is shown in FIG. 8. The first step is to read the first hole entry using the contents of the first_valid_entry (step 140). If the hole pointer in the register points to NULL (step 142), no hole is found and this is reported (step 144) and the method returns.

If the hole pointer in the register does not point to NULL (step 142), a hash value is calculated in accordance with the hole code (step 146). The hole code is the five-bit representation of the missing parameters indicated by the entry in the hole table pointed to by the hole pointer. The missing parameters are either not used in the hash calculation or replaced by a certain value, i.e. zeros or ones.

The hash result generated is then used as described above to retrieve hash pointer from the hash table 60 (FIG. 2) using the hash results as the index (step 148). IF the hash pointer points to NULL (step 150), the next hole pointer is read from the hole linked list (Step 164) and the method continues with step 142. If the hash pointer does not point to NULL (step 150), the partial socket information is read from the entry in the session database corresponding to the hash pointer (step 152).

The partial socket read from the entry in the session database is compared to the partial socket received in the packet (step 154). If the partial sockets match (step 156), a session match is declared to be found (step 158). If the partial sockets do not match, the next hash pointer is read from the linked list (step 160), and if the hash pointer does not point to NULL (step 162), the method continues with step 152 and the partial socket in the next session is checked. Otherwise, if the next hash pointer points to NULL (step 162), the next hole pointer is read from the hole linked list (step 164) and the method continues with step 142.

Once a session is recognized using the hole search method, processing of the packet and session data proceeds as in the case of complete socket search. Thus, in accordance with the present invention, session recognition may occur using complete or partial socket information. As information is extracted from subsequently received packets, any open holes are filled.

Session Database

The session database 64 (FIG. 2) will now be described in more detail. As described supra, the session database functions to store session related data for a plurality of sessions. The size of the session database may vary depending on the implementation and the system requirements. The field making up each record of the database are listed below in Table 2.

TABLE 2

Session database record fields

| Field No. | Field Description | Length (bits) |
|---|---|---|
| 1 | Local IP address | 32 |
| 2 | Remote IP address | 32 |
| 3 | Protocol | 8 |
| 4 | Local port/ICMP Seq. No./IP identification | 16 |
| 5 | Remote port/type and code/NULL | 16 |
| 6 | Next hash pointer | 16 |
| 7 | Previous hash pointer | 16 |
| 8 | Next LRU pointer | 16 |
| 9 | Previous LRU pointer | 16 |
| 10 | Number of children | 16 |
| 11 | Session status | 16 |
| 12 | Local MAC address | 48 |
| 13 | LAN ACK above change | 8 |
| 14 | LAN sequence above change | 8 |
| 15 | WAN ACK above change | 8 |
| 16 | WAN sequence above change | 8 |
| 17 | LAN ACK below change | 8 |
| 18 | LAN sequence below change | 8 |
| 19 | WAN ACK below change | 8 |
| 20 | WAN sequence below change | 8 |
| 21 | LAN sequence and ACK change threshold | 32 |
| 22 | WAN sequence and ACK change threshold | 32 |
| 23 | Expected LAN ACK | 32 |
| 24 | Expected WAN ACK | 32 |
| 25 | Maximum LAN sequence | 32 |
| 26 | Maximum WAN sequence | 32 |
| 27 | Maximum LAN window size | 32 |
| 28 | Maximum WAN window size | 32 |
| 29 | Connection state | 32 |
| 30 | Timestamp | 32 |
| 31 | LAN initial sequence | 32 |
| 32 | WAN initial sequence | 32 |
| 33 | Parent session pointer | 16 |

TABLE 2-continued

Session database record fields

| Field No. | Field Description | Length (bits) |
|---|---|---|
| 34 | First child pointer | 16 |
| 35 | Next brother pointer | 16 |
| 36 | Previous brother pointer | 16 |

The first group of fields 1–5 represents the socket used identify the session. Fields 4 and 5 are adapted to store different data depending on the protocol. For example, local and remote port data is stored for TCP and UDP packets, ICMP sequence number, type and code data is stored for ICMP echo session related packets.

Fields 6 and 7 store the next and previous hash pointer within the hash linked list described supra. The hash linked list is used during session recognition of a packet. Fields 8 and 9 store next and previous LRU pointers in a LRU linked list used to order sessions in terms of staleness. The LRU linked list operation is described in more detail infra. Field 10 stores the number of children. This field is used in the case where the application associated with this session required the opening of additional sessions. Each session (i.e. child session) opened increments the number of children.

The dynamic filter also comprises a session status register for conveying status related information to and from the CPU. The session status comprises a plurality of bits as shown below in Table 3.

TABLE 3

Session status bits

| Bit name | Description |
|---|---|
| USD | indicates whether the session record is being used (i.e. valid or not) |
| STR | indicates which side initiated the session, i.e. LAN or WAN |
| HSH | indicates this session is the first in the hash linked list |
| NAT | indicates whether this session is a network address translation (NAT) session |
| ARP | indicates address resolution protocol (ARP) NAT session |
| FRG | indicates session is a fragmented IP session |
| UCM | indicates that this session was marked by the CPU; the CPU is notified by a status bit upon each packet that belongs to this marked session |
| FRE | indicates family relations exist |
| HLD | indicates the session cannot be closed regardless of timeouts, etc. |
| PSV | indicates passive session, i.e. no timestamp updating, no packet is allowed to pass through this session |
| NOC | indicates notify on closing of a session, i.e. generate interrupt |
| SBP | indicates session bypass, i.e. no dynamic filtering, only timestamp updating |
| CSH | indicates stop all traffic for this session (e.g., if HLD flag set), while keeping the session alive (i.e. updating LRU and timestamp upon incoming packet but not allowing it) |

Note that the following flags are set by the CPU and used by the dynamic filter: UCM, FRE, HLD, PSV, NOC, SBP, CSH.

Fields 12 to 22 are used for network address translation purposes. Fields 23 to 28 and 31 to 32 are all TCP related fields and used in processing and tracking TCP packets. Field 29 stores the connection state for all protocol types. The connection state parameter is a value representing the current state of the connection. Different values are used for different protocols. As an illustrative example, the connection states for several protocols are listed below in Table 4.

TABLE 4

Connection states

| Protocol | State |
|---|---|
| TCP | LanRequestedTCPConnection |
| | WanRequestedTCPConnection |
| | LanAcceptedTCPConnection |
| | WanAcceptedTCPConnection |
| | OpenTCPConnection |
| | CloseTCPByLanRst |
| | CloseTCPByWanRst |
| | CloseTCPByFin |
| | WanSentFin_LanSentFin |
| | WanSentFin |
| | WanAckedLanFin |
| | WanAckedLanFin_WanSentFin |
| | LanSentFin |
| | LanAckedWanFin |
| | LanAckedWanFin_LanSentFin |
| General | HoleLanToWan |
| | HoleWanToLan |
| | HoleBothSides |
| UDP | OpenUDPConnection |
| ARP | OpenARPConnection |
| ICMP (echo) | OpenICMPConnection |
| IP | OpenIPConnection |
| NULL | NullState |
| ICMP error | ClosebyLanICMPError |
| | ClosebyWanICMPError |

Field 30 stores the timestamp used to age a session. Time is represented in 16 bits and stored as a time difference or delta in accordance with the particular protocol. Periodically, the CPU instructs the session management module to perform session aging whereby sessions that have aged out are closed.

Fields 33–36 are used to store pointers to sessions related to this session. Various family information is stored in the session database including brother, child and parent information.

Session Tracking Example: Open/Close TCP Session

As described hereinabove, the main filter processing is the entity that performs the rule checking once the session is recognized and the session data associated with the received packet is read from the session database. In accordance with a hardware implementation of the invention, a separate circuit is provided for each protocol to be checked on a dynamic basis, with TCP being the most complex. A software implementation utilizes application code to perform the dynamic rules checking.

As an example, the processing required to be performed by hardware circuits for the TCP protocol is described in the form of state transition diagrams for the process of opening and closing a TCP session. Note that one skilled in the electrical arts can utilize the state transition diagrams disclosed herein to construct circuitry that implements the same functionality shown in the state transition diagrams.

Figure 9:
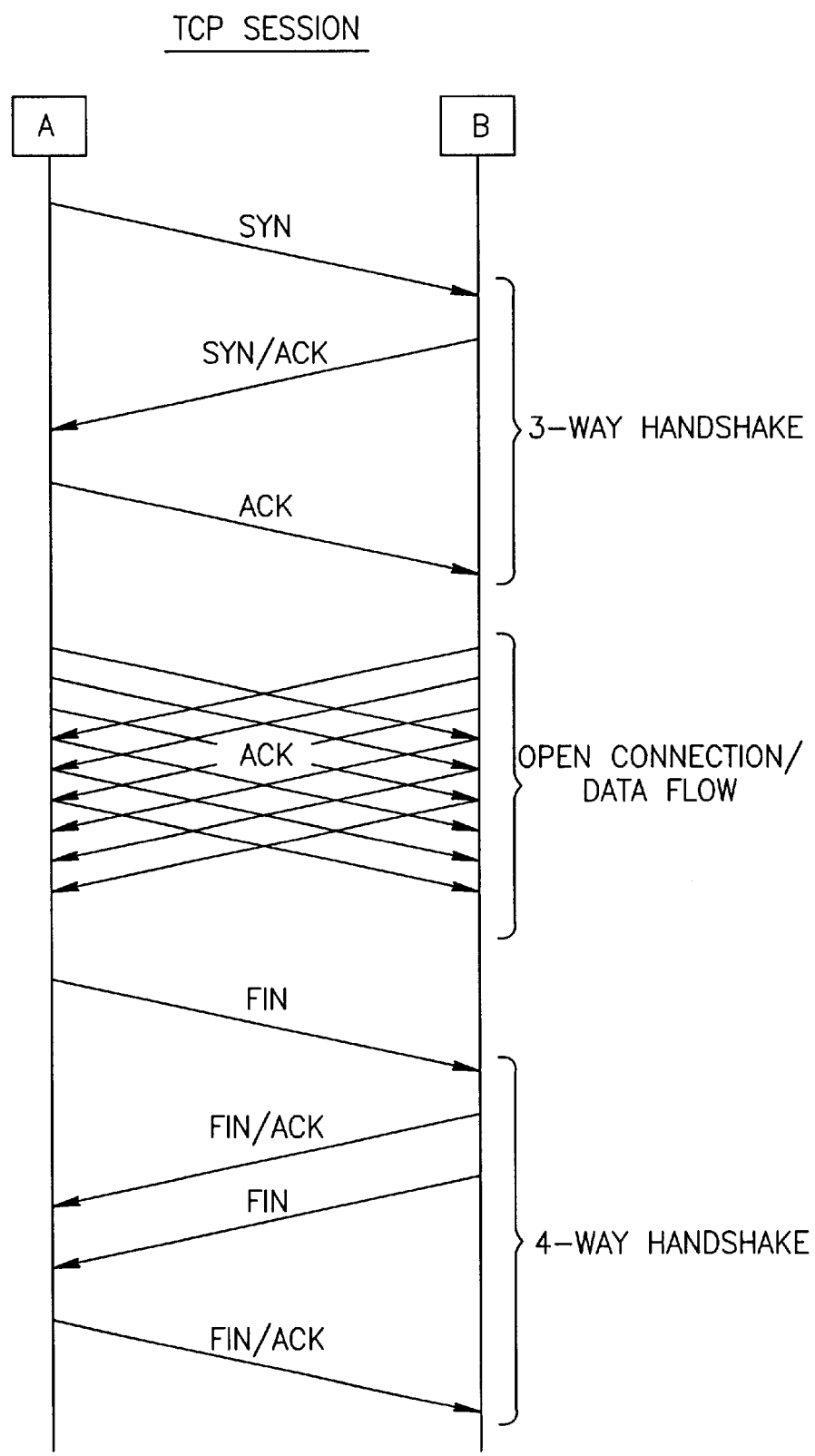
FIG. 9 is a diagram illustrating the packet flow of a TCP session.

A diagram illustrating the packet flow of a TCP session is shown in FIG. 9. The flow described herein is well known in the communications art an is shown as an aid in understanding the following state transition diagrams for the 3-way and 4-way handshake. TCP sessions are opened between two hosts A and B by requesting synchronized sequence numbers via packets comprising the SYN flag. Once opened, data flows between the two hosts as represented by the ACK packets. A TCP session is closed by both sides sending packets comprising the FIN flag indicating that the sender has no more data to send. Acknowledgement of the FIN packets closes the session.

Note that during the handshakes, the acknowledge numbers extracted from the received packet are verified against the expected acknowledge numbers stored in the session database. During the open session tracking, the sequence and acknowledge number are verified to be within the window, as described infra. If an RST packet arrives (i.e. a packet with the RESET flag asserted in the TCP header), the session is closed.

Figure 10:
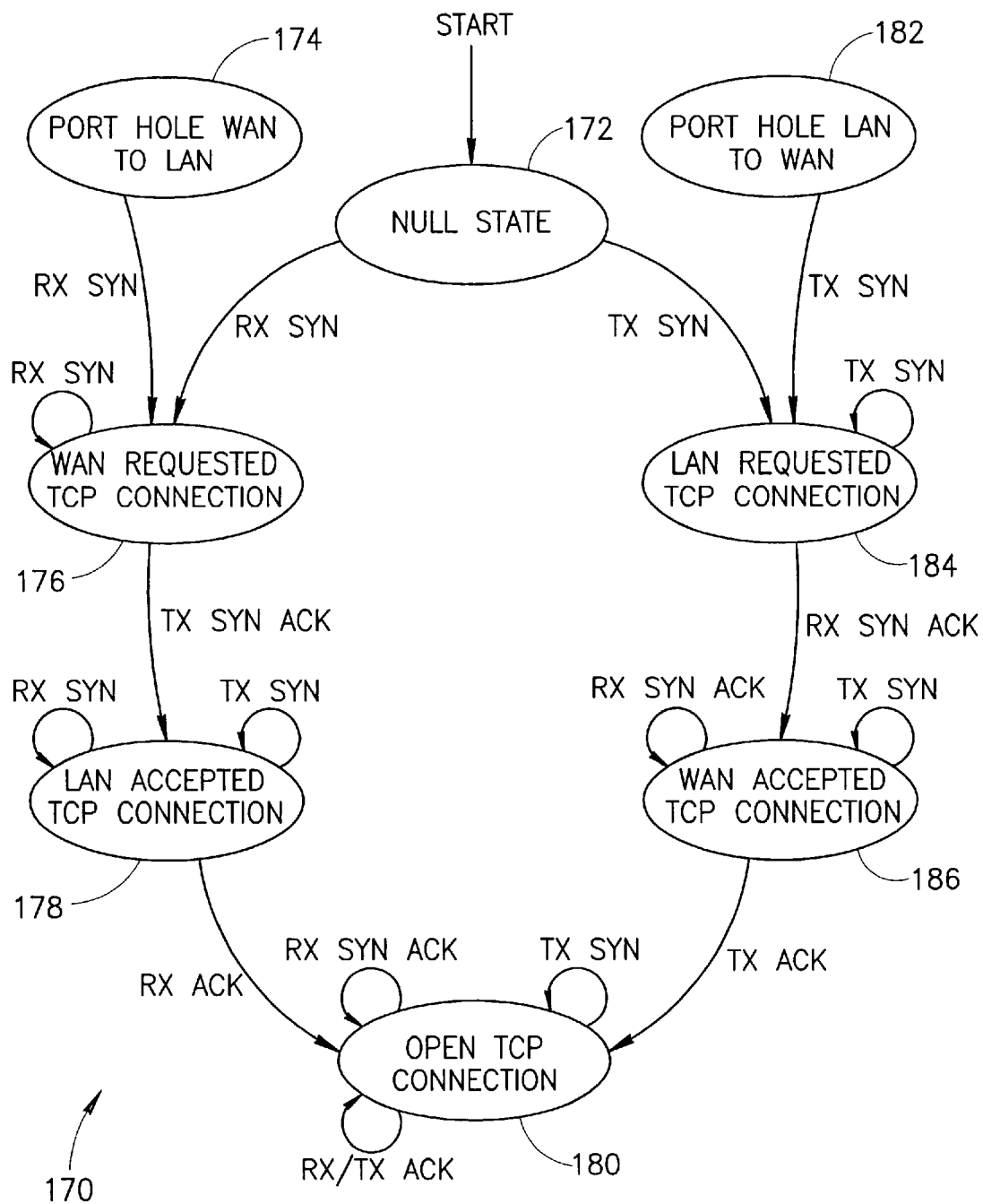
FIG. 10 is a state transition diagram illustrating the 3-way handshake that takes place upon opening a TCP session.

A state transition diagram illustrating the 3-way handshake that takes place upon opening a TCP session is shown in FIG. 10. The possible input packets include RX/TX SYN, RX/TX SYN ACK or RX/TX ACK packets. The state transition diagram, generally referenced 170, comprises a plurality of valid (i.e. legal) states and associated transitions. Note that TX indicates the direction from the LAN to the WAN and RX indicates the direction from the WAN to the LAN.

Upon detecting the opening of a TCP session, the NULL state 172 is entered. In this state, a new session is opened in the session database and the following fields are generated and stored in the session record: the received sequence numbers, timestamp, connection state indicating the NULL state, maximum window size, maximum sequence number and expected acknowledgement number. The next state depends on which side the packet was received, i.e. LAN or WAN. If a RX SYN packet is received, the next state comprises the WAN Requested TCP Connection state 176. Otherwise, the LAN Requested TCP Connection state 184 is entered. In this state, as is performed in all other states as well, the data corresponding to the recognized session as derived from the received packet is read from the session database. One or more fields are checked for legality, one or more fields are updated and the session data is written back to the session database.

In state 176, the main checking performed includes checking whether the acknowledge number correlates with the expected acknowledge number. The connection state, LAN initial sequence number, LAN maximum sequence number, LAN window size and expected LAN acknowledgement for the last portion of the handshake are updated. Receipt of RX SYN and TX SYN are legal and do not cause a state change.

Receipt of a TX SYN ACK moves the session into the LAN Accepted TCP Connection state 178 while receipt of a RX SYN ACK moves the session into the WAN accepts TCP Connection state 186. RX SYN, TX SYN, RX SYN ACK and TX SYN are legal and do not cause a change in state. In these two states, similar checking of the session parameters is performed. Once checking and updating is completed, the updated parameters are written back into the session database.

Receipt of a RX ACK while in state 178 or a TX ACK while in state 186 moves the session to the Open TCP Connection state 180. Receipt of RX SYN ACK, TX SYN, RX ACK or TX ACK are legal and do not cause a change in state. This represents the open TCP session state whereupon each TCP packet subsequently received for this session is checked for legality. For example, sequence number and acknowledgement tracking is performed. The maximum sequence number fields either for LAN or WAN, depending on the direction of the packet, is also updated.

Thus, each step of the 3-way handshake for opening a TCP session is dynamically tracked and packets attempting illegal transitions are rejected. Thus, only packets that properly conform to the TCP protocol are allowed through.

Figure 11A:
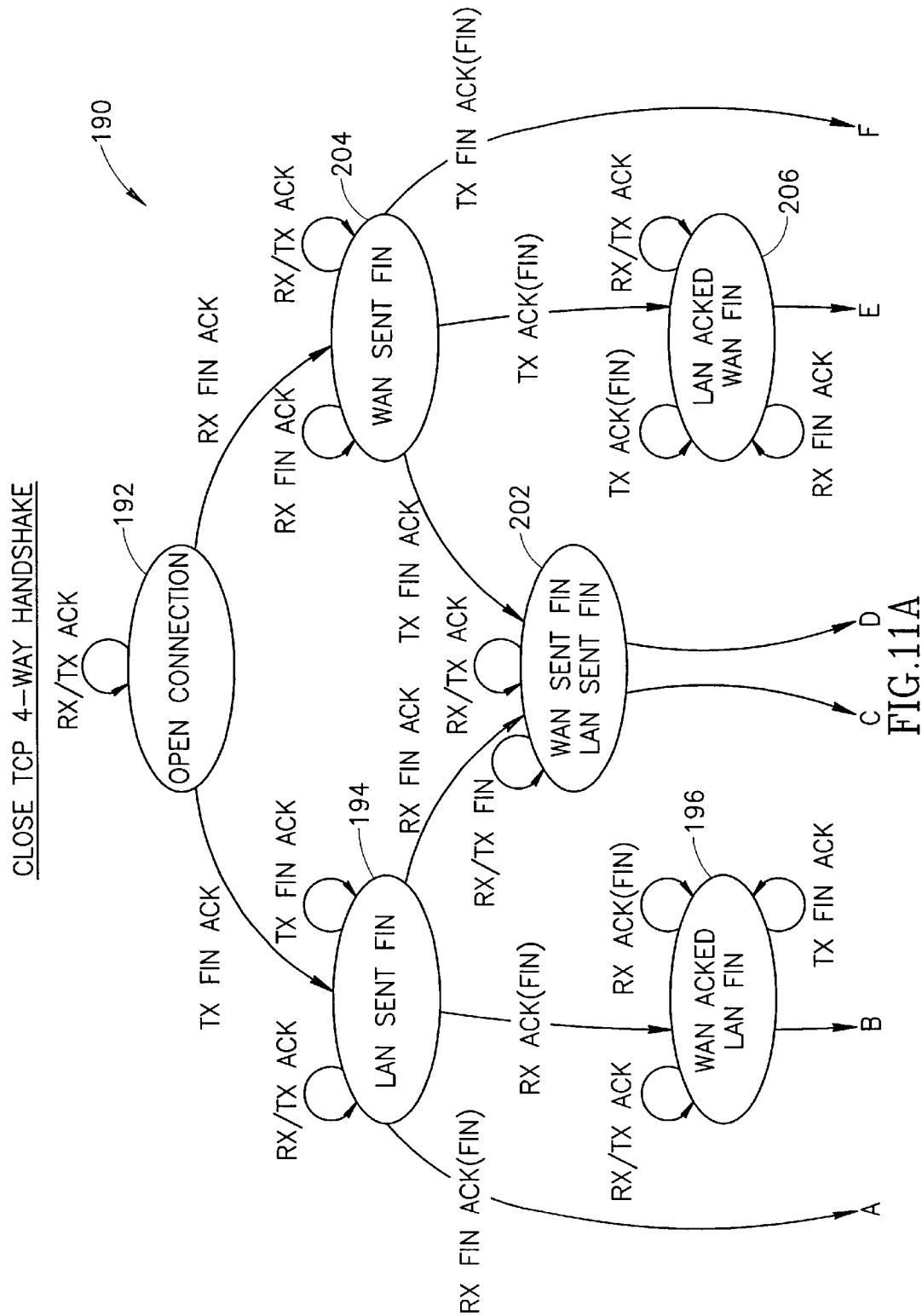
FIGS. 11A and 11B are a state transition diagram illustrating the 4-way handshake that takes place upon closing a TCP session.
Figure 11B:
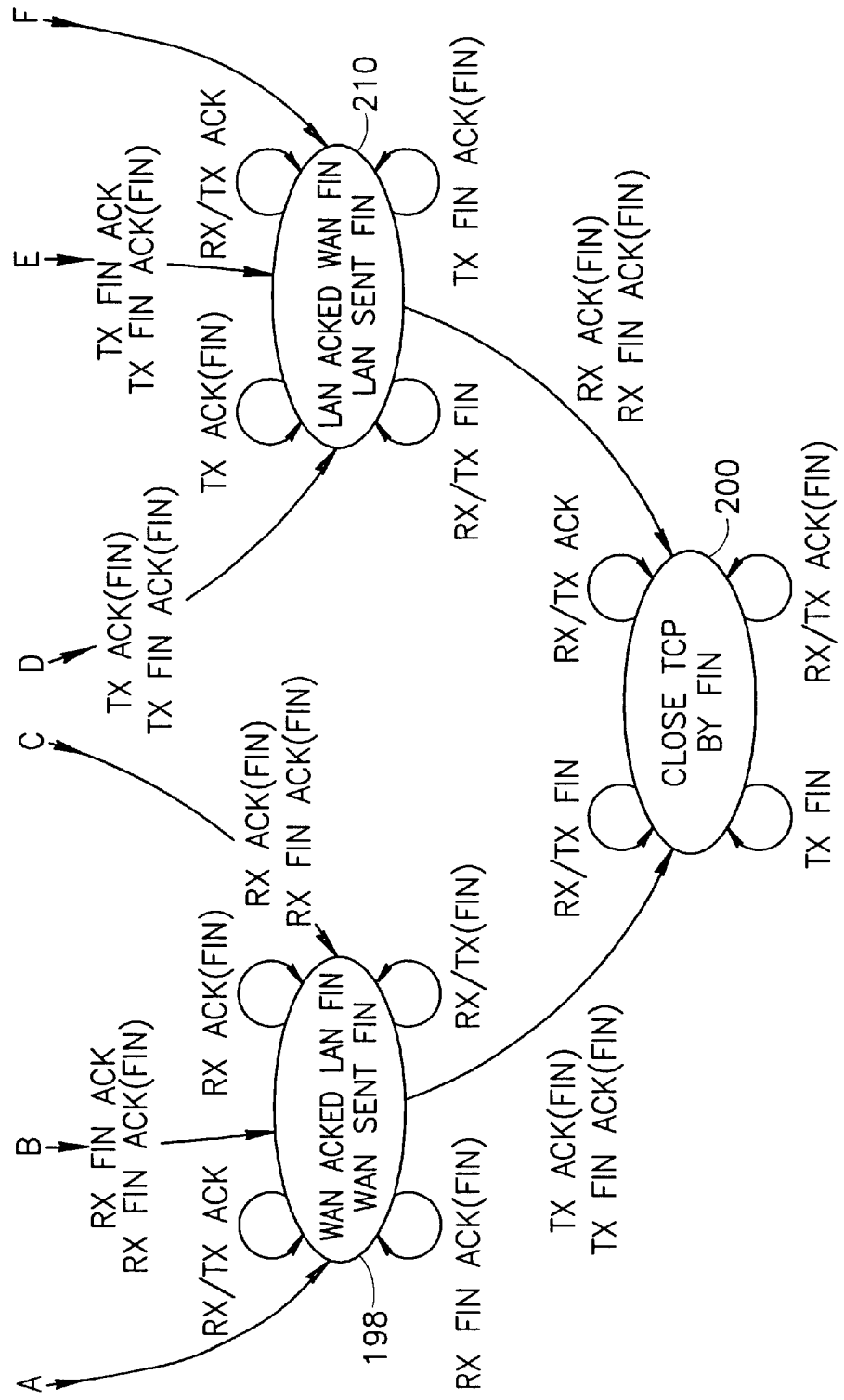

A state transition diagram illustrating the 4-way handshake that takes place upon closing a TCP session is shown in FIGS. 11A and 11B. The possible inputs in this diagram, generally referenced 190, include RX/TX ACK, RX/TX FIN ACK, RX/TX FIN ACK(FIN) or RX/TX ACK(FIN). Note that TX/RX ACK represents regular acknowledge packets while ACK(FIN) represents an acknowledge of the FIN packet.

The starting state in this diagram is the Open Connection state 192. Receipt of RX ACK or TX ACK packets do not cause changes in state. Receipt of a TX FIN ACK causes the session to move to the LAN Sent FIN state 194 while receipt of a RX FIN ACK causes the session to move to the WAN Sent FIN state 204. Receipt of a RX FIN ACK while in state 194 or a TX FIN ACK while in state 204 cause the session to move to the WAN Sent FIN/LAN Sent FIN state 202. Receipt of RX/TX FIN or RX/TX ACK packets do not cause a state change.

Receipt of a RX ACK(FIN) packet while in state 194 causes the session to move to the WAN ACKed LAN FIN state 196. Receipt of RX/TX ACK, RX ACK(FIN) or TX FIN ACK packets do not cause a state change. Receipt of a TX ACK(FIN) packet while in state 204 causes the session to move to the LAN ACKed LAN FIN state 206. Receipt of RX/TX ACK, TX ACK(FIN) or RX FIN ACK packets do not cause a state change.

Receipt of RX FIN ACK or RX FIN ACK(FIN) packets while in state 196 cause the session to move to the WAN ACKed LAN FIN/WAN Sent FIN state 198. RX/TX ACK, RX ACK(FIN), RX FIN ACK(FIN) and RX/TX FIN packets do not cause a state change. Receipt of TX FIN ACK or TX FIN ACK(FIN) packets while in state 206 cause the session to move to the WAN ACKed LAN FIN/WAN Sent FIN state 210. RX/TX ACK, TX ACK(FIN), TX FIN ACK(FIN) and RX/TX FIN packets do not cause a state change.

Receipt of a RX FIN ACK(FIN) packet while in state 194 causes the session to move directly to the WAN ACKed LAN FIN/WAN Sent FIN state 198. Receipt of a TX FIN ACK(FIN) packet while in state 204 causes the session to move directly to the LAN ACKed WAN FIN/LAN Sent FIN state 210.

Receipt of TX ACK (FIN) or TX FIN ACK(FIN) packets while in state 198 or receipt of RX ACK(FIN) or RX FIN ACK(FIN) packets while in state 210 cause the session to move to the Close TCP By FIN state 200. RX/TX FIN, RX/TX ACK, TX FIN and RX/TX ACK(FIN) packets do not cause a change in state.

Thus, each step of the 4-way handshake for closing a TCP session is dynamically tracked and packets attempting illegal transitions are rejected. Thus, only packets that properly conform to the TCP protocol are allowed through.

Figure 12:
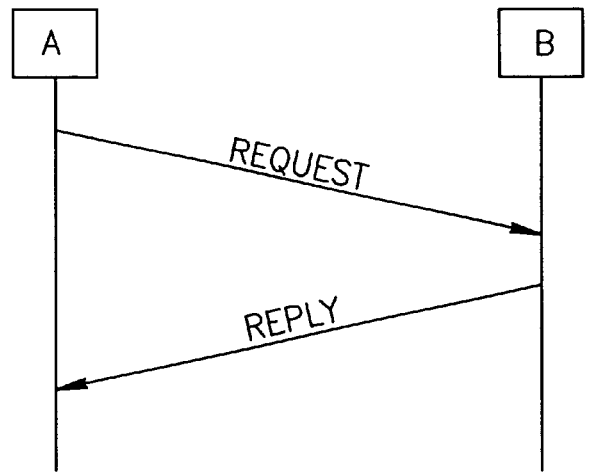
FIG. 12 is a diagram illustrating the packet flow of an ARP session.

The invention also comprises session tracking for other protocols as well,. A diagram illustrating the packet flow of an ARP session is shown in FIG. 12. Assuming two hosts A and B, the ARP session tracking comprises opening a session upon receipt of a ARP request packet. Subsequent ARP request/reply packets with the same socket are allowed (including retransmissions). Preferably, a short delta timeout is specified after an ARP reply since an open ARP session should not be held open for an extended length of time. An ARP reply closes the session.

Figure 13:
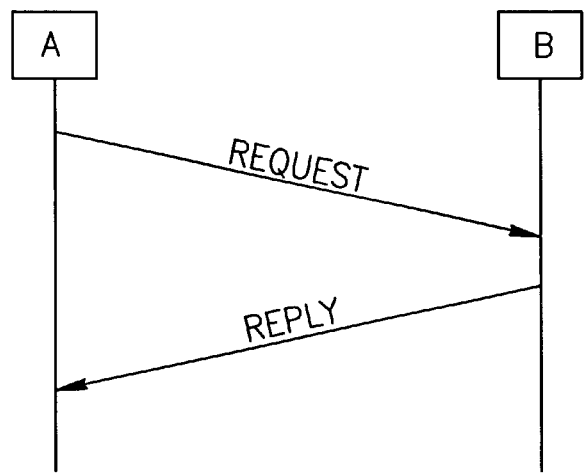
FIG. 13 is a diagram illustrating the packet flow of an ICMP echo session.

A diagram illustrating the packet flow of an ICMP echo session is shown in FIG. 13. Assuming two hosts A and B, the ICMP echo request opens an ICMP echo session. Once the session is open, only an ICMP echo reply with the same socket is allowed. No retransmission is permitted because echo retransmission utilizes different sequence ID numbers, i.e. different sockets. An ICMP echo reply closes the session.

Figure 14:
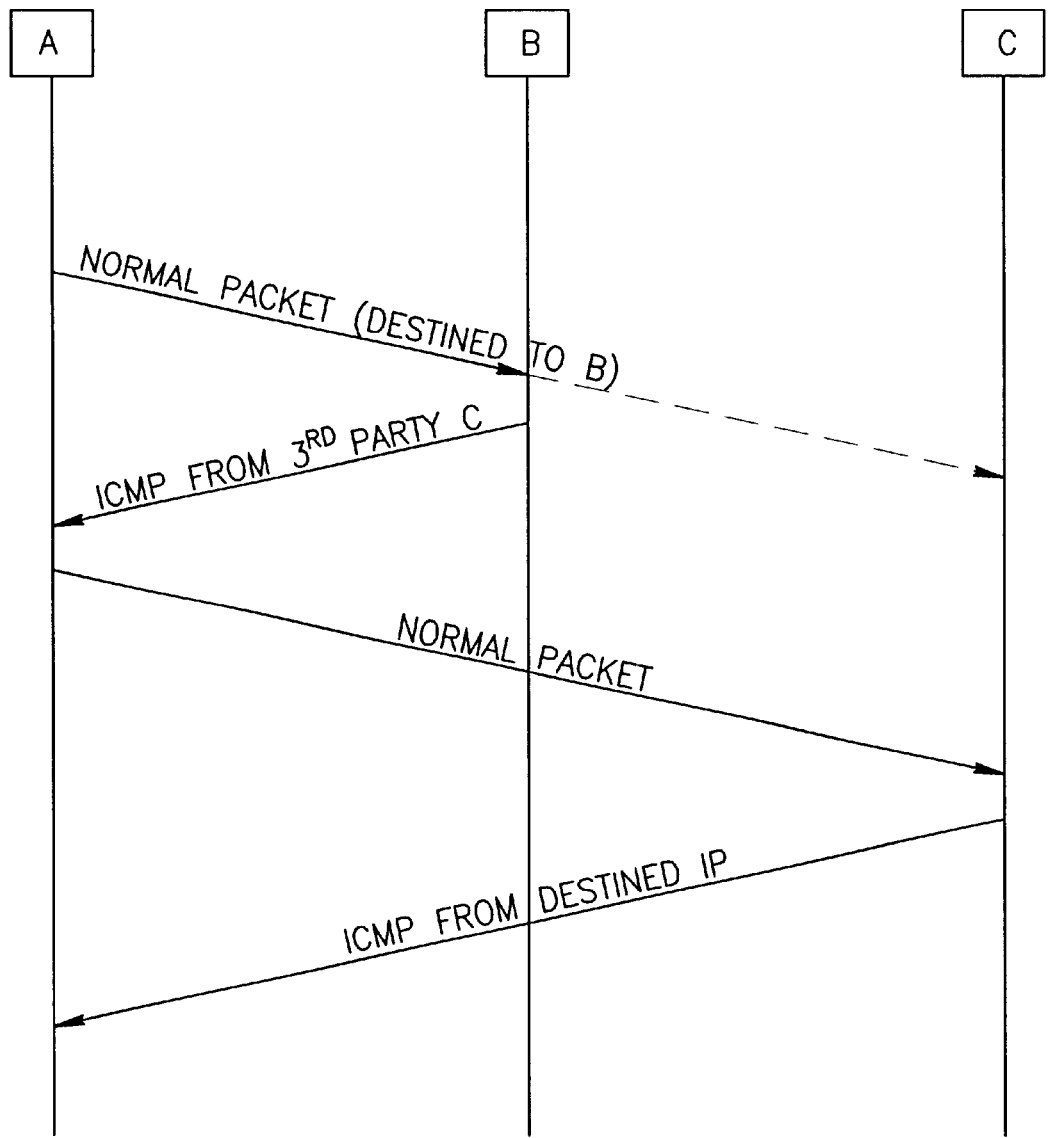
FIG. 14 is a diagram illustrating the packet flow of an ICMP message/error session.

A diagram illustrating the packet flow of an ICMP message/error session is shown in FIG. 14. The ICMP message/error packet comprises an IP header field, ICMP header, IP header and 64 bits of TCP header. An ICMP message/error encapsulated the original packet's IP header in addition to 64 bits of the TCP header. An ICMP message/error packet must be allowed by the security policy rule database (i.e. the external static filter), otherwise, it will be automatically rejected by the main filter processing. The dynamic filter processes only the encapsulated partial packet (i.e. the session is recognized according to the encapsulated sockets). If allowed by the static filter and the session was found during session recognition then (1) an ICMP message packet is allowed and only the timestamp field of the session is modified, (2) an ICMP error packet is allowed and the connection state is changed to 'closed by LAN/WAN ICMP ERROR.' Subsequent packets belonging to this session will be rejected due to this error. External configuration (such as via the CPU) determines which kind of ICMP (ICMP TYPE/CODE) is considered to be a message and which is considered to be an error. An ICMP packet with security problems should be rejected in advance according to the security policy rule database.

Sequence/Acknowledge Number Tracking

Figure 15:
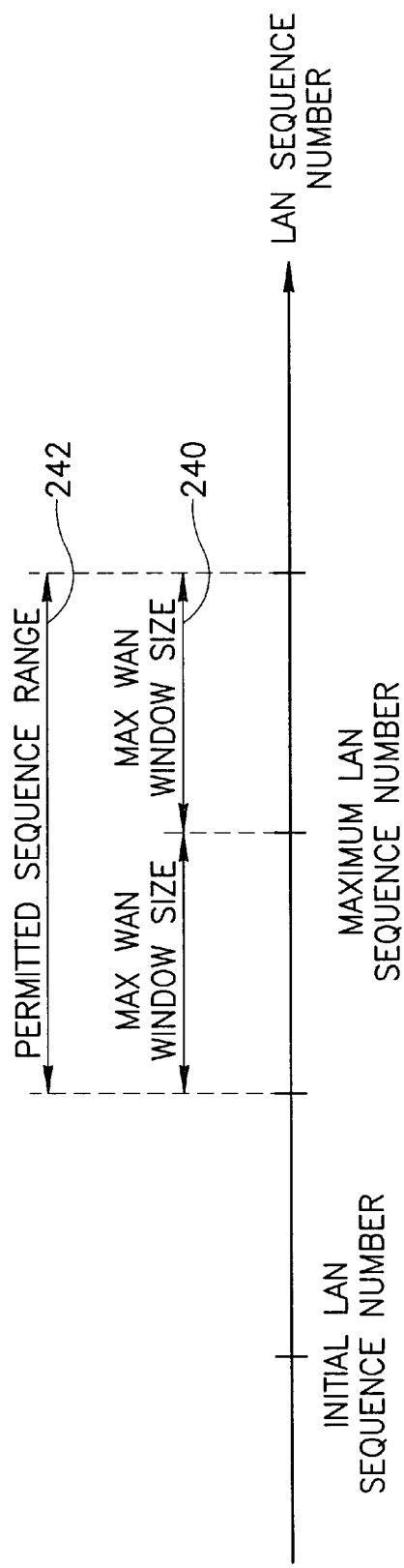
FIG. 15 is a diagram illustrating the sequence number window tracking performed during rules checking by the main filter processor.

In accordance with the invention, the main filter processing is adapted to track the TCP/IP session sequence numbers. A diagram illustrating the sequence number window tracking performed during rules checking by the main filter processor is shown in FIG. 15. The sequence number tracking is performed by the main filter processing while in the Open TCP Connection state 180 using the buffer size field in the TCP header. Assuming the x-axis represents the LAN sequence number, the maximum WAN window size 240 in bytes is subtracted and added to the maximum LAN sequence number as indicated by the vertical dashed lines. The initial LAN sequence number is indicated on the left end of the x-axis. The permitted LAN sequence range 242 is indicated.

For each packet, the lower limit is calculated as the higher of the initial LAN sequence number or the maximum LAN sequence minus the maximum WAN window size. The upper limit is the sum of the maximum LAN sequence number and the maximum WAN window size. If the sequence number of the transmitted packet falls between the lower and upper limits, the packet is allowed. Otherwise, the packet is rejected. Packets with sequence numbers outside the permitted sequence range are rejected. Note that the sequence number of a received packet is tracked in the same way with the difference being the swapping of LAN and WAN entities in the above description.

Figure 16:
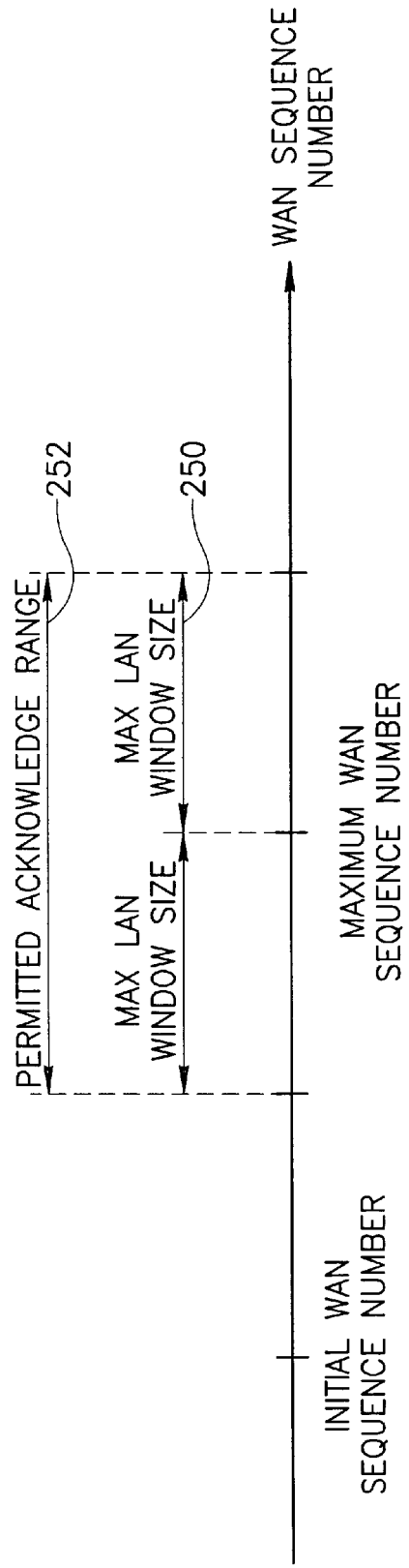
FIG. 16 is a diagram illustrating the acknowledge sequence number window tracking performed during rules checking by the main filter processor.

A diagram illustrating the acknowledge sequence number window tracking performed during rules checking by the main filter processor is shown in FIG. 16. The acknowledge number tracking is performed by the main filter processing while in the Open TCP Connection state 180 using the buffer size field in the TCP header. Assuming the x-axis represents the WAN sequence number, the maximum LAN window size 250 in bytes is subtracted and added to the maximum WAN sequence number as indicated by the vertical dashed lines. The initial WAN sequence number is indicated on the left end of the x-axis. The permitted acknowledge range 252 is indicated. The rules checking for the acknowledge number is analogous to that of the sequence number as described depending on whether the packet was sent or received by the WAN or LAN.

It is noted that in accordance with the invention, the main filter processing module is operative to dynamically check the rules associated with other protocols as well, including but not limited to, UDP, ICMP including both echo request/reply, control and error messages, ARP, ICMP fragmentation and IP.

Session Management Module

In accordance with the invention, the session management module is operative to maintain a linked list for storing the sessions in least recently used order. The session management module performs several functions relating to maintenance and control of the session database. The session management module functions to check the validity of timestamps (i.e. aging) of sessions stored in the session database upon command from the CPU. When the command to perform aging is received, the timestamp field of each record in the session database is examined and those records whose time limit has expired are closed. Aging is performed on the sessions in order to flush sessions that become stale and that were not closed normally for some reason. For example a session may age out if it corresponds to a packet that violated a rule.

The session management module also functions to provide an unused (i.e. empty and available) session to the CPU or to the main filter processing 54 (FIG. 2) upon request. In operation, the CPU/main filter processing requests a new session and the session management module searches for one and returns the index to the CPU/main filter processing respectively. Similarly, the session management module also gracefully disconnects a session that is in use when required, i.e. aging CPU request, main filter processing request, etc. The session management module also opens new sessions wherein LRU pointers and hash pointers in the hash table and session database are updated.

Figure 17:
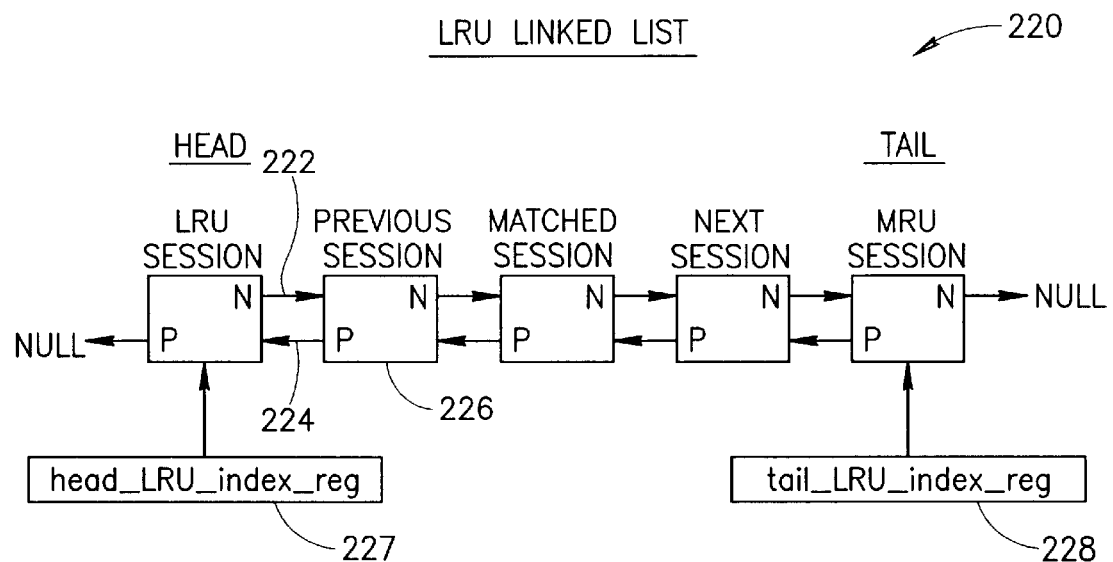
FIG. 17 is a diagram illustrating the least recently used link list structure used to track the session staleness.

The least recently used (LRU) link list structure used to track session use is shown in FIG. 17. Every time a session is recognized (i.e. accessed), and the corresponding packet is allowed by the main filter processing, the session is placed at the tail of the LRU linked list. The doubly linked list, generally referenced 220, comprises a plurality of sessions 226 each having a next pointer 222 and a previous pointer 224. The session at the tail of the LRU linked list is pointed to by the contents of a tail_LRU_index_reg register 228. The session pointed to by this register represents the most recently used session. The session at the head of the LRU linked list is pointed to by the contents of a head_LRU_index_reg register 227.

The session management module also updates and maintains the family relations upon closing a session, as described in more detail infra.

The LRU linked list is used to determine, in the event the session database is full, which session to remove when a new session is added. In this case, the least recently used session is closed and the record used to store the new session.

Figure 18:
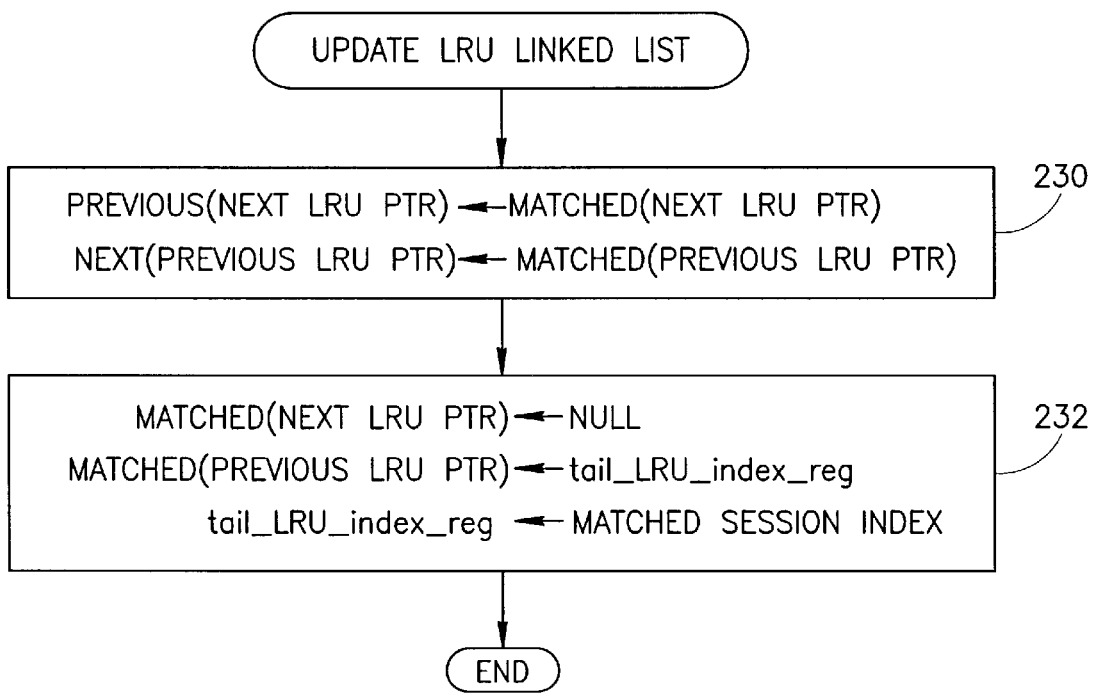
FIG. 18 is a flow diagram illustrating the method of updating the LRU linked list upon recognition of a session associated with an input packet.

A flow diagram illustrating the method of updating the LRU linked list upon recognition of a session associated with an input packet is shown in FIG. 18. The update method is performed every time a matching session is accessed and the corresponding packet allowed. With reference to FIG. 17, in particular, the sessions labeled Previous session, Matched session and Next session, the matched session is moved from its location in the list to the tail to become the most recently used session. The matched session is removed by (1) setting the next LRU pointer of the Previous session to the next LRU pointer of the Matched session and (2) setting the previous LRU pointer of the Next session to the previous LRU pointer of the Matched session (step 230).

The Matched session is then made the most recently used by (1) setting the next LRU pointer of the Matched session to NULL, (2) setting the previous LRU pointer of the Matched session to the contents of the tail_LRU_index_reg register and (3) setting the tail_LRU_index_reg register to the index of the Matched session (step 232).

Figure 19:
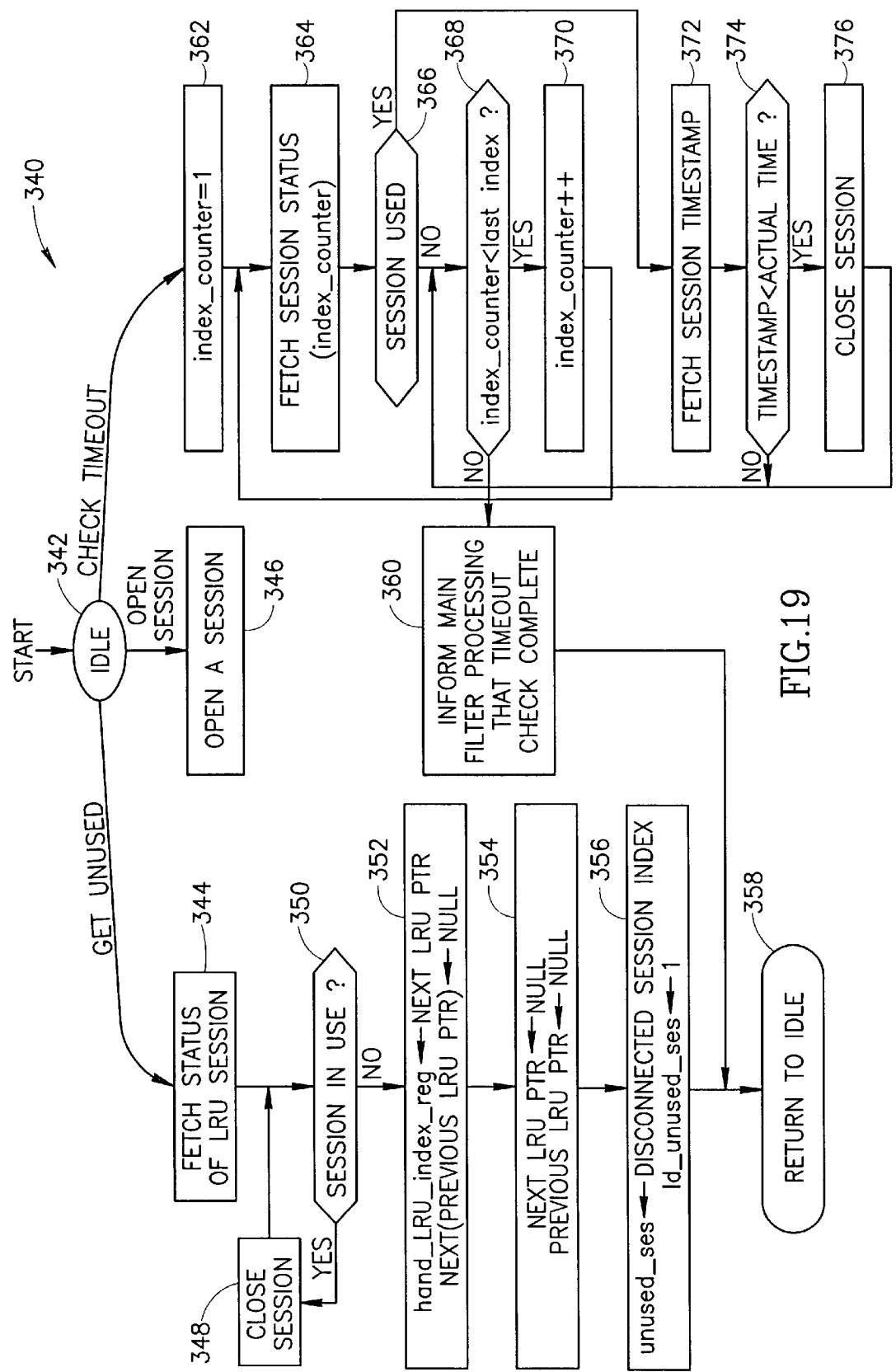
FIG. 19 is a flow diagram illustrating the processing of the session management module of the present invention.

A flow diagram illustrating the processing of the session management module of the present invention is shown in FIG. 19. The session management processing begins in the idle step 342 and moves to the next step depending on the event. In the case of a 'get unused' instruction from the CPU or main filter processor, the status of the least recently used session is fetched (step 344). If the session is in use (step 350), the session is then closed (step 348). If the session is not in use, the head_LRU_index_reg is set to the next LRU pointer of the least recently used session and the next(previous LRU pointer) is set to NULL (step 352). The next and previous LRU pointers of the session removed are then set to NULL, thereby removing the least recently used session from the LRU linked list (step 354). The unused_ses variable is set to the session just disconnected and the flag to inform the CPU or the main filter processing accordingly is set to '1' (step 356). The process then returns to Idle (step 358).

A 'check timeout' command from the CPU causes the session manager to begin checking timeouts of the sessions. The index_counter is incremented (step 362) and the status of a session is fetched (i.e. the index_counter) (step 364). If the session is currently in use (step 366), the session timestamp is fetched (step 372). If the timestamp is more than the actual time (i.e. the session has aged out) (step 374), the session is closed (step 376).

If the session is not used or if the session has not aged out, it is checked whether the index_counter is less than the last index (step 368). If it is, the index_counter is incremented (step 370) and the method continues with step 364. If it is not, the timeout check is complete, the main filter processing is informed (step 360) and the method returns to Idle (step 358).

Figure 20:
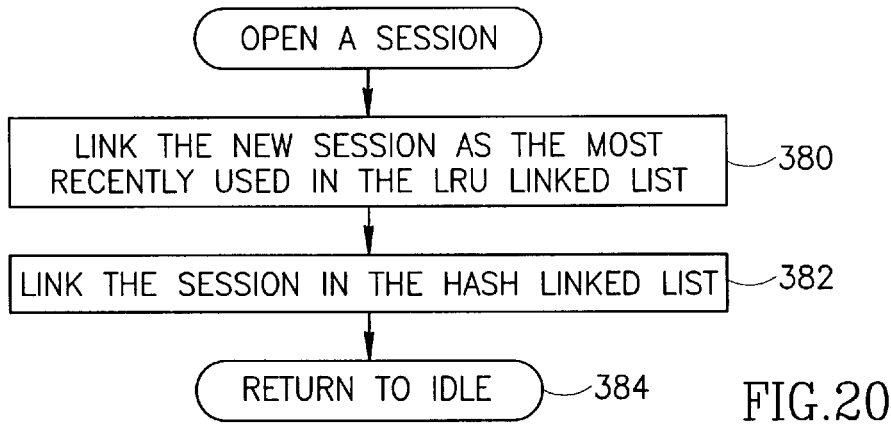
FIG. 20 is a flow diagram illustrating the processing performed by the session management module of the present invention to open a session.

A flow diagram illustrating the processing performed by the session management module of the present invention to open a session is shown in FIG. 20. When a session is opened, it is placed at the tail of the LRU linked list (step 380). The session is also placed in the appropriate place in the hash linked list (step 382). The method then returns to the Idle state (step 384).

Figure 21:
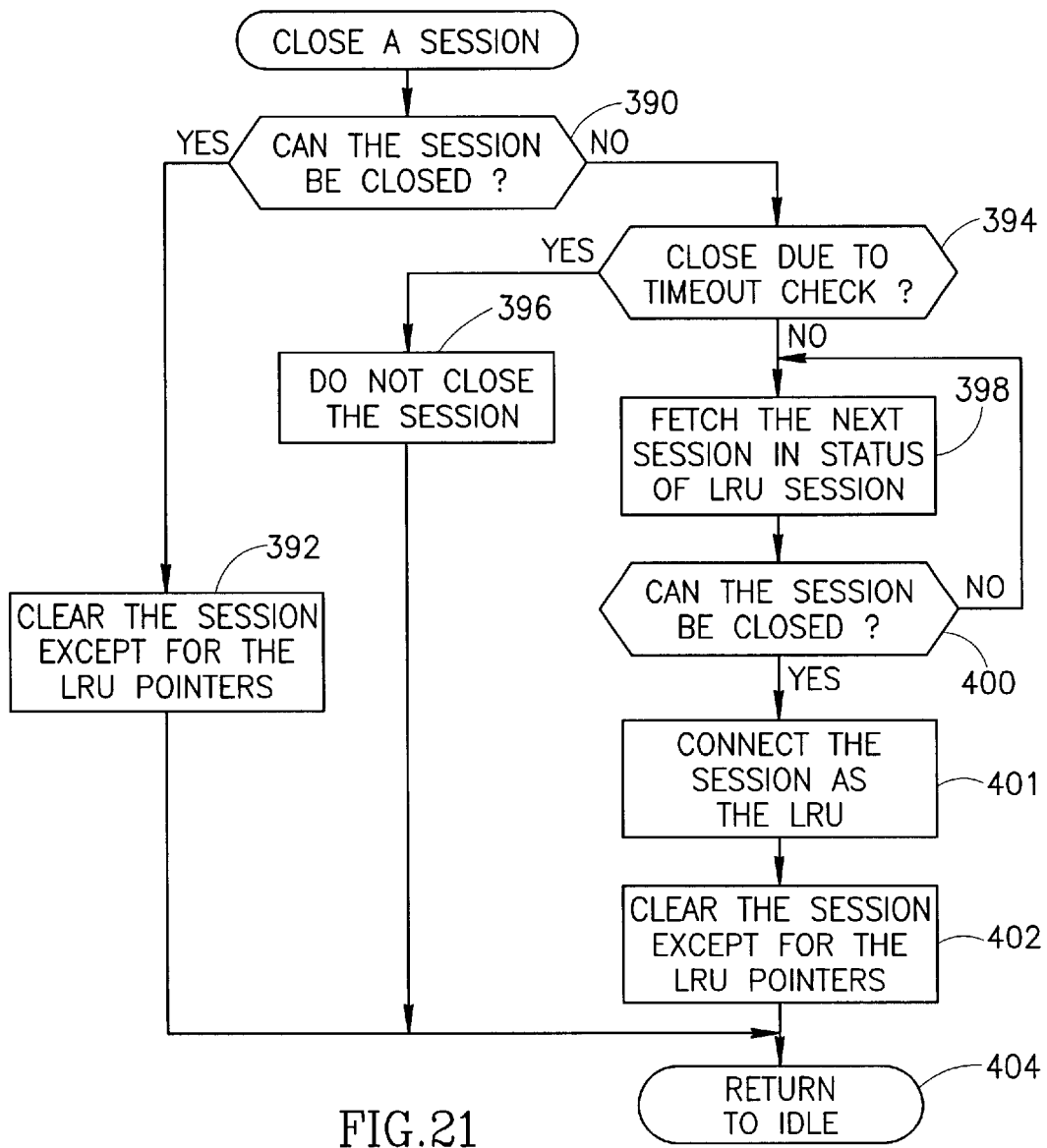
FIG. 21 is a flow diagram illustrating the processing performed by the session management module of the present invention to close a session.

A flow diagram illustrating the processing performed by the session management module of the present invention to close a session is shown in FIG. 21. If the session is closable as specified by the HLD flag (step 390), the session is cleared without modification of the LRU pointers (step 392). The method then returns to the Idle state (step 404).

If the session cannot be closed (step 390), and the request to close was due to a timeout check (step 394), the session is not closed (step 396) and the method returns to the Idle state (step 404). If the close request was not due to a timeout check, the next session pointed to by the least recently used session is fetched (step 398). If this session cannot be closed (step 400), the method continues with step 398 and the process repeats until a session is found that can be closed. If a session that can be closed is found (step 400), the session is configured as the LRU (step 401). The session is then cleared except for the LRU pointers (step 402) and the method then returns to the Idle state (step 404).

Figure 22:
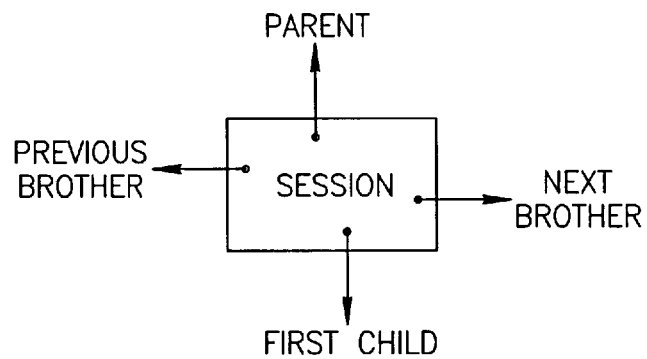
FIG. 22 is a diagram illustrating the family pointers for a session.

As stated above, the session management module also functions to maintain four family relation pointers in the session database that define the family relations of the session. The family relation pointers are updated upon the closing of a session. A diagram illustrating the family pointers for a session is shown in FIG. 22. Each session can have a parent pointer that points to a parent session, a first child pointer that points from the parent to its first child and next/previous brother pointers that are used to implement a doubly linked list between sessions that have the same parent.

Fields 33–36 in the session database are used to store the family relation pointer information. The family relations themselves are determined by the CPU. If a session is closed by the session manager (i.e. due to timeout check or to make room for a new session), the session manager is operative to update the family pointers accordingly.

In accordance with the present invention, the family pointers are used to logically connect between sessions that belong to the same application. For example, FTP service opens two different TCP/IP sessions: a control session on port 21 and a data session on port 20. FTP control is the parent session while FTP data is the child session. Generally, any family relation is possible using the 4 family pointers along with the number of children field (10) i.e. any nesting parent/child application is supported. When a parent session is to be closed via LRU/timeout mechanisms, the session manager uses the family pointers to close all the subsequently created sessions that belong to the family.

Sometimes, not all the connections are used simultaneously. For example, it is possible that the application connects using only the child session for a period of time. In order to avoid closing the parent control session by the LRU/timeout mechanisms, the CPU sets th HLD bit in the parent session. The session manager will not close a session that has an opened child session (i.e. number of children >0) and whose HLD bit is asserted. When one of the family sessions is closed, the session manager is operative to maintain all the family pointers, i.e. close all its child sessions (if they exist), update the family brother sessions doubly linked list (if it exists), decrement the number of children of its parent session (if any exist) and update the parent/first, child doubly linked list.

Figure 23:
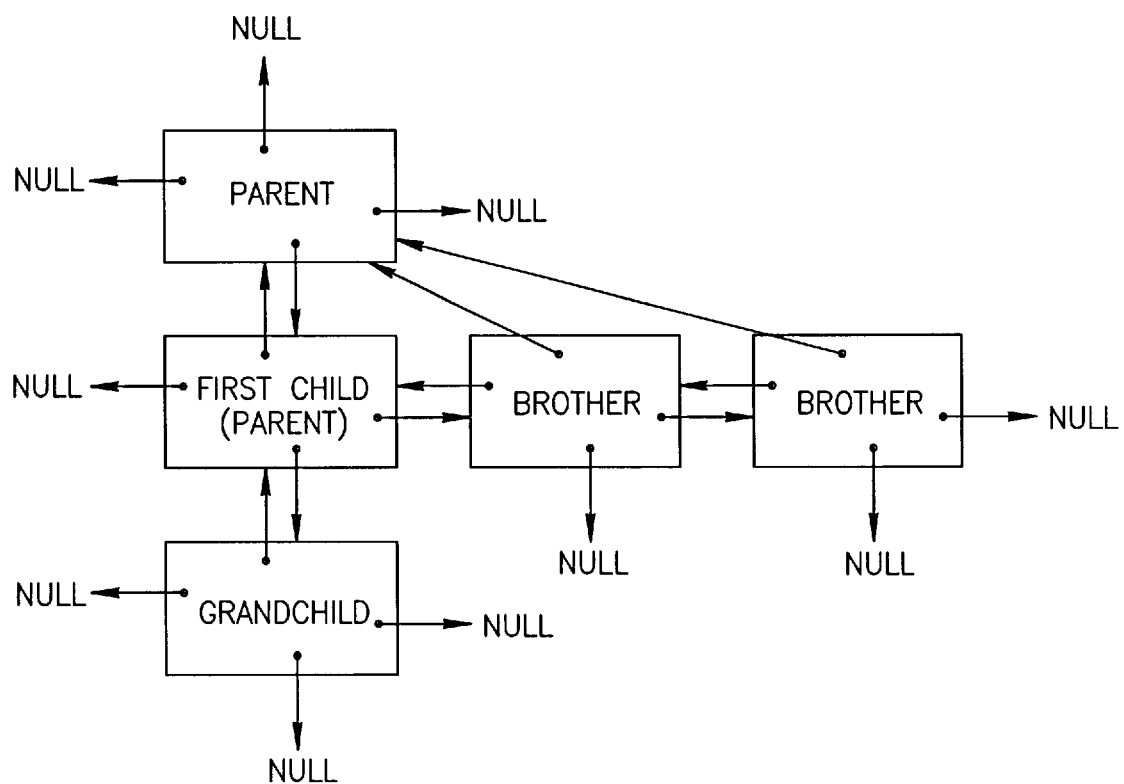
FIG. 23 is a diagram illustrating an example family relationship among a plurality of sessions.

A diagram illustrating an example family relationship among a plurality of sessions is shown in FIG. 23. In this example, a parent session is related to a child session that, in turn, is related to two brother sessions. The first child session is also a parent session having a child session that is the grandchild of the upper parent session.

Computer Embodiment

Figure 24:
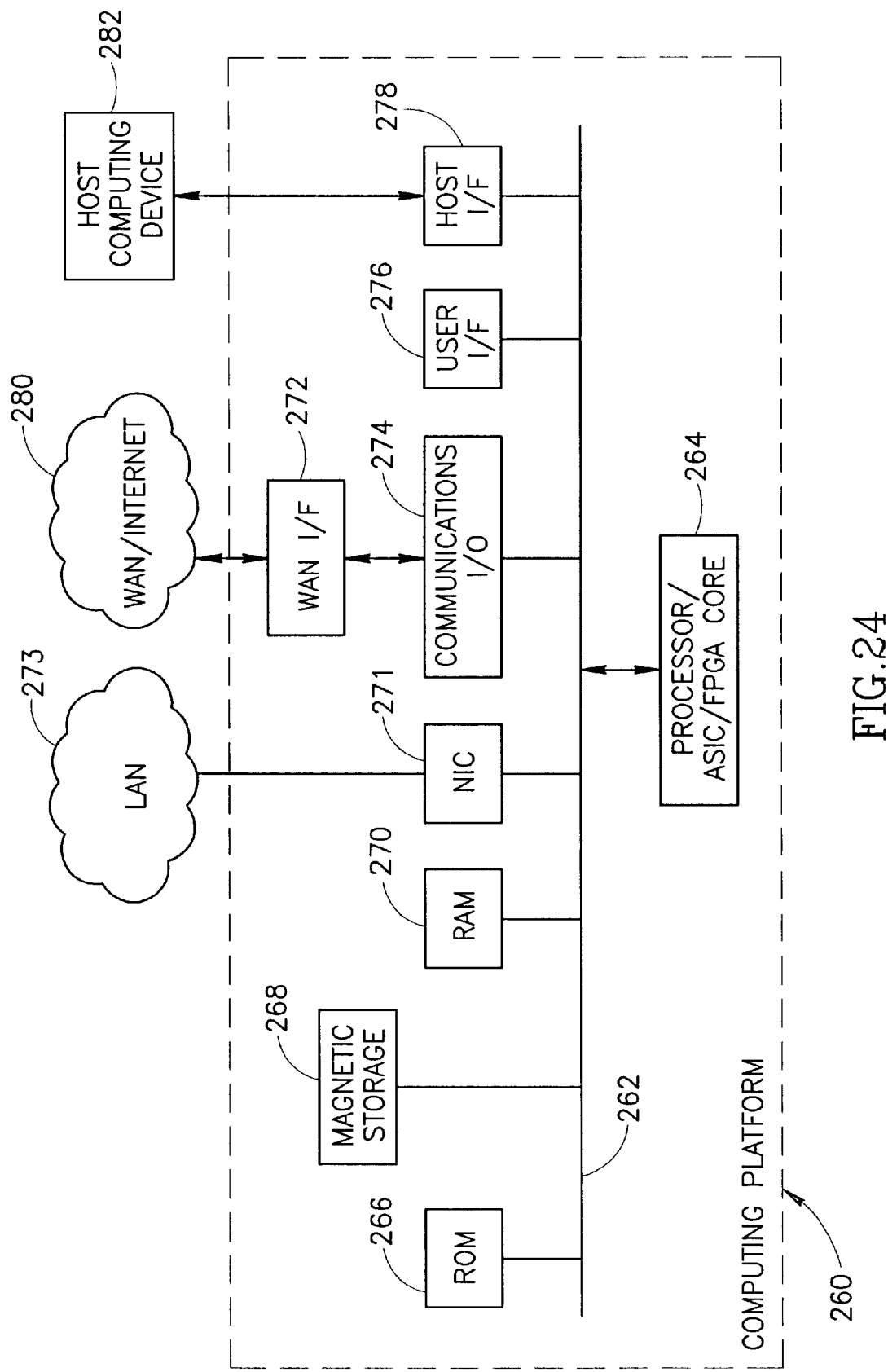
FIG. 24 is a block diagram illustrating an example computer processing system to platform adapted to perform the dynamic packet filtering with session tracking method of the present invention.

In another embodiment, a computer is operative to execute software adapted to perform the dynamic packet filter method of the present invention. A block diagram illustrating an example computer processing system to platform adapted to perform the dynamic packet filtering with session tracking method of the present invention is shown FIG. 24. The system may be incorporated within a communications device such as a PDA, cellular telephone, cable modem, broadband modem, laptop, PC, network transmission or switching equipment, network device or any other wired or wireless communications device. The device may be constructed using any combination of hardware and/or software.

The computer system, generally referenced 260, comprises a processor 264 which may be implemented as a microcontroller, microprocessor, microcomputer, ASIC core, FPGA core, central processing unit (CPU) or digital signal processor (DSP). The system further comprises static read only memory (ROM) 266 and dynamic main memory (e.g., RAM) 270 all in communication with the processor. The processor is also in communication, via a bus 262, with a number of peripheral devices that are also included in the computer system.

The device is connected to a WAN 280 such as the Internet via a WAN interface 272. The interface comprises wired and/or wireless interfaces to one or more WAN communication channels. Communications I/O processing 274 transfers data between the WAN interface and the processor. The computer system is also connected to a LAN 273 via a Network Interface Card (NIC) 271 depending on the implementation. In operation, the computer system is operative to dynamically filter inbound packets from the WAN to the LAN and outbound packets from the LAN to the WAN as described supra.

An optional user interface 276 responds to user inputs and provides feedback and other status information. A host interface 278 connects a host computing device 282 to the system. The host is adapted to configure, control and maintain the operation of the system. The system also comprises magnetic storage device 268 for storing application programs and data. The system comprises computer readable storage medium which may include any suitable memory means including but not limited to magnetic storage, optical storage, CD-ROM drive, ZIP drive, DVD drive, DAT cassette, semiconductor volatile or non-volatile memory, biological memory devices, or any other memory storage device.

Software updated to implement the functionality of the dynamic filter of the present invention is adapted to reside on a computer readable medium, such as a magnetic disk within a disk drive unit. Alternatively, the computer readable medium may comprise a floppy disk, Flash memory card, EPROM, EEROM, EEPROM based memory, bubble memory storage, ROM storage, etc. The software adapted to perform the dynamic packet filter method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of filtering an input packet stream, said method comprising the steps of:

establishing a session database adapted to store session related data for a plurality of sessions, each session corresponding to a socket;

opening a new session upon receipt of a socket not previously stored in said session database;

recognizing a session associated with a received packet in accordance with its associated socket;

establishing and maintaining a least recently used (LRU) doubly linked list having a head and tail wherein most recently used sessions are stored the tail and least recently used sessions are stored at the head;

processing the session data corresponding to said received packet in accordance with a plurality of predefined rules to generate processing results; and deciding whether to allow or deny said received packet in accordance with said processing results.

2. The method according to claim 1, further comprising the step of updating the contents of said session database in accordance with said processing results.

3. The method according to claim 1, wherein said step of deciding comprises allowing said received packet if said received packet does not violate any of said plurality of predefined rules.

4. The method according to claim 1, wherein said step of deciding comprises denying said received packet if said received packet is in violation of one or more of said plurality of predefined rules.

5. The method according to claim 1, further comprising the step a removing unused sessions from said session database.

6. The method according to claim 1, wherein in the vent said LRU List is full, the session at the head is deleted and a new session is added to the tail.

7. The method according to claim 1, further comprising the step of removing sessions whose associated timestamps have exceeded a predetermined threshold.

8. The method according to claim 1, further comprising the step of establishing a hole table comprising a plurality of records each representing a unique subset of incomplete socket information.

9. The method according to claim 1, wherein said step of opening a new session comprises the steps of:

storing session data related to said new session in said session database;

calculating a hash value on the socket associated with said new session; and storing said hash value in a hash table.

10. The method according to claim 1, wherein said step of recognizing a session comprises the steps of:

calculating a hash value on the socket associated with the session to be recognized;

looking up a hash pointer in a hash table using hash result as an index;

retrieving socket data from said session database in accordance with said hush pointer; and recognizing said session if the retrieved socket matches the socket associated with the received session.

11. The method according to claim 1, wherein said step of processing the session data comprises tracking the state of a transmission control protocol (TCP) opening handshake if the session comprises a TCP opening session.

12. The method according to claim 1, wherein said step of processing the session data comprises tracking the state of a transmission control protocol (TCP) closing handshake if the session comprises a TCP closing session.

13. The method according to claim 1, wherein said step of processing the session data comprises tracking the sequence and acknowledge of said session against a window if said session comprises a transmission control protocol (TCP) session.

14. A method of monitoring the state of a communications session, said method comprising the steps of:

establishing a session database adapted to store session related data for a plurality of sessions, each session corresponding to a socket;

recognizing a session in accordance with a first hash calculation on the socket associated with a received packet;

establishing and maintaining a least recently used (LRU) doubly linked list having a head and tail wherein most recently used sessions are stored at the tail and least recently used sessions are stored at the head;

recognizing a hole session in accordance with a second hash calculation on a partial socket associated with said received packet;

reading session data from said session database, said session data associated with either a recognized session or a recognized hole session;

tracking a connection state of said session and checking said state against a plurality of rules to determine whether to allow or deny said received pack; and writing updated session data back into said session database.

15. The method according to claim 14, wherein said step of determining to allow or deny comprises allowing said received packet if said received packet does not violate any of said plurality of rules.

16. The method according to claim 14, wherein said step of determining to allow or deny comprises denying said received packet if said received packet is in violation of one or more of said plurality of rules.

17. The method according to claim 14, further comprising the step of removing unused sessions from said session database.

18. The method according to claim 14, further comprising the step of removing sessions whose associated timestamps have exceeded a predetermined threshold.

19. The method according to claim 14, wherein said step of opening a new session comprises the steps of:

storing session data related to said new session in said session database;

calculating a hash value on the socket associated with said new session; and storing said hash value in a hash table.

20. The method according to claim 14, wherein said step of recognizing a session comprises the steps of:

calculating said first hash value on the socket associated with the session to be recognized;

looking up a hash pointer in a hash table using said first hush result as an index;

retrieving socket data from said session database in accordance with said hash pointer; and recognizing said session if the retrieved socket matches the socket associated with the received session.

21. The method according to claim 14, wherein said step of recognizing a hole session comprises the steps of:

calculating said second hash value on said partial socket associated with the session to be recognized;

looking up a hash pointer in a hash table using said second hash result as an index;

retrieving partial socket data from said session database in accordance with said hash pointer; and recognizing said hole session if the retrieved partial socket matches the partial socket associated with the received session.

22. The method according to claim 14, wherein said step of tracking said connection state comprises tracking a transmission control protocol (TCP) opening handshake if the session comprises a TCP opening session.

23. The method according to claim 14, wherein said step of tracking said connection state comprises tracking a transmission control protocol (TCP) closing handshake if the session comprises a TCP closing session.

24. The method according to claim 14, wherein said step of tracking said connection state comprises tracking the sequence and acknowledge of said session against a window if said session comprises a transmission control protocol (TCP) session.

25. A dynamic filter for filtering an input packet stream, comprising
session database adapted to store session related data for a plurality of sessions, each session corresponding to a socket;
a session recognition module adapted to search said session database for a session whose associated socket matches that of a received packet;
a session management module adapted to maintain said session database including adding, deleting and modifying sessions in said session database, and adapted to establish and maintain a least recently used (LRU) doubly linked list for tracking session use having a head and tail wherein most recently used sessions are stored at the tail and least recently used sessions are stored at the head; and
a main filter module operative to track a connection state of the session corresponding to a receive packet and checking said connection state against a plurality of rules to determine whether to allow or deny said received packet.

26. The dynamic filter according to claim 25, wherein said main filter is adapted to write modified session data back into said session database after the determination is made whether to allow or deny said receive packet.

27. The dynamic filter according to claim 25, wherein said main filter is adapted to allow said received packet if said received packet does not violate any of said plurality of rules.

28. The dynamic filter according to claim 25, wherein said main filter is adapted deny said received packet if said received packet is in violation of one or more of said plurality of rules.

29. The dynamic filter according to claim 25, wherein said session management module is adapted to remove unused sessions from said session database.

30. The dynamic filter according to claim 25, wherein said session management module is adapted to remove sessions whose associated timestamps have exceeded a predetermined threshold.

31. The dynamic filter according to claim 25, further comprising a hole table consisting of a plurality of records each representing a unique subset of incomplete socket information.

32. The dynamic filter according to claim 25, wherein said session management module comprises session opening means adapted to:
store session data related to said new session in said session database;
calculate a hash value on the socket associated with said new session; and
store said hash value in a hash table.

33. The dynamic filter according to claim 25, wherein said session recognition module comprises means adapted to:
calculate a hash value on the socket associated with the session to be recognized;
look up a hash pointer in a hash table using hash result as an index;
retrieve socket data from said session database in accordance with said hash pointer; and
recognize said session if the retrieved socket matches the socket associated with the received session.

34. The dynamic filter according to claim 25, wherein said main filter comprises means for tracking the state of a transmission control protocol (TCP) opening handshake if the session comprises a TCP opening session.

35. The dynamic filter according to claim 25, wherein said main filter comprises means for tracking the state of a transmission control protocol (TCP) closing handshake if the session comprises a TCP closing session.

36. The dynamic filter according to claim 25, wherein said main filter comprises means for tracking the sequence and acknowledge of said session against a window if said session comprises a transmission control protocol (TCP) session.

37. The dynamic filter according to claim 25, wherein said dynamic filter is implemented in a field programmable gate array (FPGA).

38. The dynamic filter according to claim 25, wherein said dynamic filter is implemented in an application specific integrated circuit (ASIC).

39. A digital computing apparatus, comprising:
communication means adapted to connect said apparatus to a wide area network (WAN);
memory means comprising volatile and non-volatile memory, said non-volatile memory adapted to store one or more application programs;
a processor coupled to said memory means and said communication means for executing said one or more application programs; and
a dynamic packet filter for filtering an input packet stream, comprising;
a session database adapted to store session related data for a plurality of sessions, each session corresponding to a socket;
a session recognition module adapted to search said session database for a session whose associated socket matches that of a received packet;
a session management module adapted to both maintain said session database including adding, deleting and modifying sessions in said session database and to establish and maintain a least recently used (LRU) doubly linked list for tracking session use having a head and tail wherein most recently used sessions are stored at the tail and least recently used sessions are stored at the head; and
a main filter module operative to track a connection state of the session corresponding to a receive packet and checking said connection state against a plurality of rules to determine whether to allow or deny said received packet.

40. A computer readable storage medium having a computer program embodied thereon for causing a suitably programmed system to search for a plurality of strings by performing the following steps when such program is executed on said system;

establishing a session database adapted to store session related data for a plurality of sessions, each session corresponding to a socket;

opening a new session upon receipt of a socket not previously stored in said session database;

recognizing a session associated with a received packet in accordance with its associated socket;

establishing and maintaining a least recently used (LRU) doubly linked list having a head and tail wherein most recently used sessions are stored at the tail and least recently used sessions are stored at the head;

processing the session data corresponding to said received packet in accordance with a plurality of predefined rules to generate processing results; and deciding whether to allow or deny said received packet in accordance with said processing results.

* * * * *